US012002450B2

(12) United States Patent
Li et al.

(10) Patent No.: US 12,002,450 B2
(45) Date of Patent: Jun. 4, 2024

(54) SPEECH RECOGNITION SYSTEMS AND METHODS

(71) Applicant: KABUSHIKI KAISHA TOSHIBA, Minato-ku (JP)

(72) Inventors: Mohan Li, Cambridge (GB); Tudor-Catalin Zorila, Cambridge (GB); Rama Sanand Doddipatla, Cambridge (GB)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 246 days.

(21) Appl. No.: 17/183,743

(22) Filed: Feb. 24, 2021

(65) Prior Publication Data
US 2022/0157294 A1    May 19, 2022

(30) Foreign Application Priority Data

Nov. 16, 2020    (GB) .................................... 2018008

(51) Int. Cl.
| | | |
|---|---|---|
| *G10L 15/00* | (2013.01) | |
| *G06N 3/047* | (2023.01) | |
| *G06N 3/08* | (2023.01) | |
| *G10L 19/02* | (2013.01) | |
| *G10L 25/78* | (2013.01) | |

(52) U.S. Cl.
CPC .............. *G10L 15/00* (2013.01); *G06N 3/047* (2023.01); *G06N 3/08* (2013.01); *G10L 19/02* (2013.01); *G10L 25/78* (2013.01); *G10L 2025/783* (2013.01)

(58) Field of Classification Search
CPC ......... G10L 15/00; G10L 19/02; G10L 25/78; G10L 2025/783; G06N 3/047; G06N 3/08
See application file for complete search history.

(56) References Cited

U.S. PATENT DOCUMENTS

| | | | |
|---|---|---|---|
| 2015/0039304 A1 | 2/2015 | Wein | |
| 2019/0147255 A1* | 5/2019 | Homayounfar | G06N 3/08 701/23 |

(Continued)

OTHER PUBLICATIONS

Combined Great Britain Office Action and Search Report issued May 17, 2021 in Great Britain Patent Application No. 2018008.9, 5 pages.

(Continued)

*Primary Examiner* — Bhavesh M Mehta
*Assistant Examiner* — Edward Tracy, Jr.
(74) *Attorney, Agent, or Firm* — Oblon, McClelland, Maier & Neustadt, L.L.P.

(57) ABSTRACT

A computer-implemented method for speech recognition, comprising receiving a frame of speech audio; encoding the frame of speech audio; calculating a halting probability based on the frame of speech audio; adding the halting probability to a first accumulator variable; in response to the first accumulator variable exceeding or reaching a first threshold, calculating a context vector based on the halting probability and the encoding of the frame of speech audio; performing a decoding step using the context vector to derive a token; and executing a function based on the derived token, wherein the executed function comprises at least one of text output or command performance.

18 Claims, 19 Drawing Sheets
(6 of 19 Drawing Sheet(s) Filed in Color)

(56) References Cited

U.S. PATENT DOCUMENTS

| | | |
|---|---|---|
| 2020/0026760 A1 | 1/2020 | Chiu et al. |
| 2020/0126538 A1 | 4/2020 | Han et al. |
| 2020/0312306 A1 | 10/2020 | Mortiz et al. |
| 2020/0335083 A1* | 10/2020 | Wan ................. G06N 3/084 |
| 2021/0279414 A1* | 9/2021 | Mrini ............... G06F 40/211 |
| 2022/0051078 A1* | 2/2022 | Gong ............... G06N 3/045 |
| 2022/0253698 A1* | 8/2022 | Banino ............. G06N 3/045 |

OTHER PUBLICATIONS

M. Li, et al., "End-to-End Speech Recognition with Adaptive Computation Steps", in IEEE International Conference on Acoustics, Speech and Signal Processing (ICASSP), 2019, pp. 6246-6250.

L. Dong, et al., "Cif: Continuous Integrate-and-Fire for End-to-End Speech Recognition", in IEEE International Conference on Acoustics, Speech and Signal Processing (ICASSP), 2020, pp. 6079-6083.

A. Vaswani, et al., "Attention is All You Need", 31st Conference on Neural Information Processing Systems (NIPS 2017), Long Beach, CA, USA, pp. 1-15.

United Kingdom Office Action issued Jun. 29, 2023 in United Kingdom Patent Application No. 2018008.9, 5 pages.

Graves, "Adaptive Computation Time for Recurrent Neural Networks", Google DeepMind, Feb. 21, 2017, pp. 1-19.

* cited by examiner

300A

For Each Self-Attention Decoder Layer of a Decoder Neural Network:

For Each Self-Attention Head of the Self-Attention Decoder Layer:

Initialize a Respective Accumulator Variable
        310A

For Each Frame of Speech Audio until
        the Accumulator Variable Reaches/Exceeds a $1^{st}$ Threshold or
        a Count of Frames of Speech Audio Reaches/Exceeds a $2^{nd}$ Threshold:

Calculate a Halting Probability based on
            an Encoding of the Frame of Speech Audio
            320A Add the Halting Probability to the
            Respective Accumulator Variable
            330A Calculate a Context Vector
        based on the Halting Probabilities and the Encodings
        340A Calculate a Combined Context Vector
    based on the Context Vectors for Each of the Self-Attention Heads
    350A Performing a Decoding Step using the
Combined Context Vectors to Derive a Token
360B

For Each Self-Attention Decoder Layer of a Decoder Neural Network:

Initialize a Shared Accumulator Variable
310B

For Each Frame of Speech Audio until
the Shared Accumulator Variable Exceeds a $1^{st}$ Threshold or
a Count of Frames of Speech Audio Exceeds a $2^{nd}$ Threshold:

For Each Self-Attention Head of the Self-Attention Decoder Layer:

Calculate a Halting Probability based on
an Encoding of the Frame of Speech Audio
320B Add the Halting Probability to the
Shared Accumulator Variable
330B Calculate a Context Vector for Each of the Self Attention Heads
based on the Respective Halting Probabilities and the Encodings
340B Calculate a Combined Context Vector
based on the Context Vectors for Each of the Self Attention Heads
350B Performing a Decoding Step using the
Combined Context Vector to Derive a Token
360B

For Each Training Pair of a Training Set:

Derive a Sequence of Tokens 402B

For Each Self-Attention Decoder Layer of a Decoder Neural Network:

For Each Self-Attention Head of the Self-Attention Decoder Layer:

Initialize a Respective Accumulator Variable
410B

For Each of a Plurality of Frames of Speech Audio of the Training Pair until the Respective Accumulator Variable Exceeds/Reaches a Threshold:

Calculate a Halting Probability based on an Encoding of the Frame of Speech Audio
420B Add the Halting Probability to the Respective Accumulator Variable
430B Calculate a Context Vector based on the Halting Probabilities and the Encodings
440B Calculate a Combined Context Vector based on the Context Vectors for Each of the Self Attention Heads
445B Performing a Decoding Step using the Combined Context Vector to Derive a Token
450B Updating Weights of each of the Self-Attention Decoder Layers based on a Difference Between the Derived Sequence of Tokens and the Training Sequence of Tokens in accordance with a Loss Function
404B

For Each Training Pair of a Training Set:

Derive a Sequence of Tokens 402C

For Each Self-Attention Decoder Layer of a Decoder Neural Network:

Initialize a Shared Accumulator Variable
410C

For Each of a Plurality of Frames of Speech Audio of the Training Pair until the Shared Accumulator Variable Exceeds/Reaches a Threshold:

For Each Self-Attention Head of the Self-Attention Decoder Layer:

Calculate a Halting Probability based on
an Encoding of the Frame of Speech Audio
420C Add the Halting Probability to the
Shared Accumulator Variable
430C Calculate a Context Vector for Each of the Attention Heads
based on the Respective Halting Probabilities and the Encodings
440C Calculate a Combined Context Vector
based on the Context Vectors for Each of the Self Attention Heads
445C Performing a Decoding Step using the
Combined Context Vector to Derive a Token
450C Updating Weights of each of the Self-Attention Decoder Layers
based on a Difference Between the Derived Sequence of Tokens and
the Training Sequence of Tokens in accordance with a Loss Function
460C

FIG. 4C

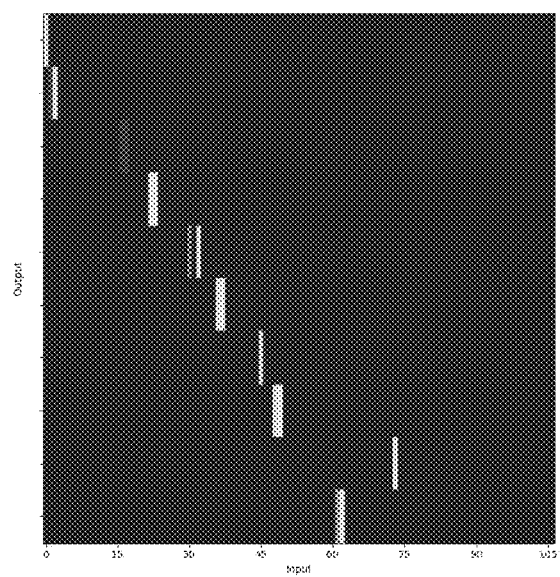
830
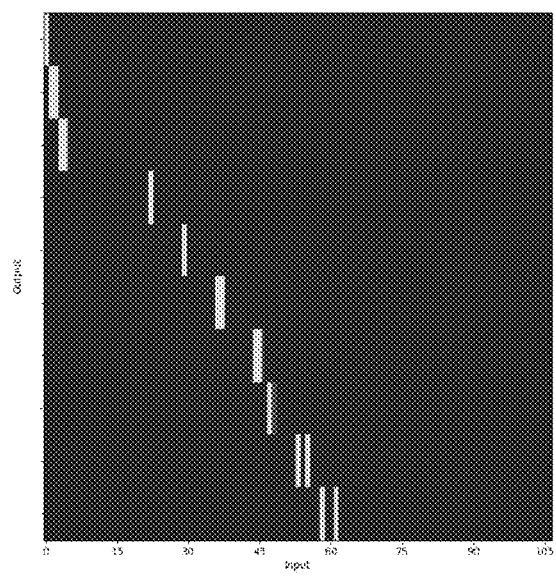
840
FIG. 8B

SPEECH RECOGNITION SYSTEMS AND METHODS

CROSS REFERENCE TO RELATED APPLICATION

This application claims the benefit of United Kingdom Application number 2018008.9 filed on Nov. 16, 2020, which is hereby incorporated by reference.

FIELD

Embodiments described herein are concerned with speech recognition methods and systems, and methods for the training thereof.

BACKGROUND

Speech recognition methods and systems receive speech audio and recognise the content of such speech audio, e.g. the textual content of such speech audio. Previous speech recognition systems include hybrid systems, and may include an acoustic model (AM), pronunciation lexicon and language model (LM) to determine the content of speech audio, e.g. decode speech. Earlier hybrid systems utilized Hidden Markov Models (HMMs) or similar statistical methods for the acoustic model and/or the language model. Later hybrid systems utilize neural networks for at least one of the acoustic model and/or the language model. These systems may be referred to as deep speech recognition systems.

Speech recognition systems with end-to-end architectures have also been introduced. In these systems, a single neural network is used into which the acoustic model, pronunciation lexicon and language model can be considered to be implicitly integrated. The single neural network may be a recurrent neural network. More recently, transformer models have been used for speech recognition systems. Transformer models may perform speech recognition using a self-attention mechanism by which the dependencies are captured regardless of their distance. Transformer models may employ an encoder-decoder framework.

BRIEF DESCRIPTION OF FIGURES

The patent or application file contains at least one drawing executed in color. Copies of this patent or patent application publication with color drawing(s) will be provided by the Office upon request and payment of the necessary fee.

FIG. 3A is a flow diagram of a first variation of a decoding method for speech recognition in accordance with example embodiments;

FIG. 3B is a flow diagram of a second variation of a decoding method for speech recognition in accordance with example embodiments;

FIG. 4B is a flow diagram of a first variation of a method for training a speech recognition system in accordance with example embodiments;

FIG. 4C is a flow diagram of a second variation of a method for training a speech recognition system in accordance with example embodiments;

FIGS. 8A and 8B are diagrams of the halting probabilities produced in the decoding process in a first DACS-based Transformer ASR system in accordance with example embodiments;

DETAILED DESCRIPTION

Figure 1A:
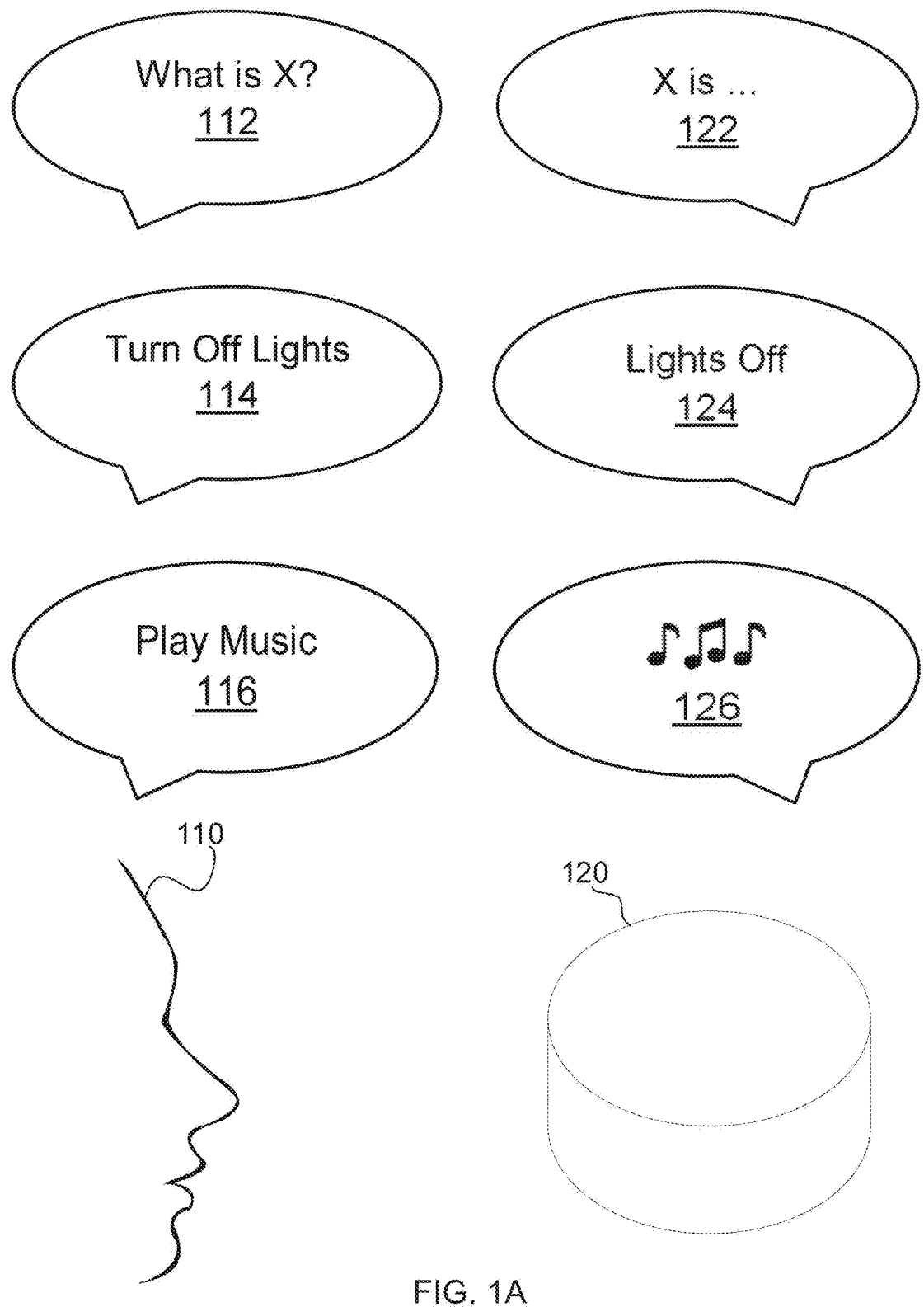
FIG. 1A is an illustration of a voice assistant system in accordance with example embodiments.

In a first embodiment, a computer-implemented method for speech recognition is provided. The method comprises: receiving a frame of speech audio; encoding the frame of speech audio; calculating a halting probability based on the encoding of the frame of speech audio; adding the halting probability to a first accumulator variable; in response to the first accumulator variable exceeding or reaching a first threshold, calculating a context vector based on the halting probability and the encoding of the frame of speech audio; performing a decoding step using the context vector to derive a token; and executing a function based on the derived token. The executed function comprises at least one of text output or command performance.

The described method reduces latency for and improves the quality, e.g. the accuracy, of speech recognition, especially online speech recognition, as compared to existing state-of-the-art speech recognition methods. Online speech recognition methods are methods where speech recognition is performed as frames of audio are received, e.g. the speech recognition method does not have access to the entirety of an utterance prior to beginning performance of the method. Therefore, online speech recognition methods can perform speech recognition and execute functions, e.g. output text or perform commands, responsive to the receipt of live audio, e.g. from a microphone, rather than audio having to be recorded then speech recognition performed as is the case for offline speech recognition methods.

The context vector may be further based on respective encodings and halting probabilities for a preceding one or more frames of speech audio.

In response to the count of the preceding one or more frames of speech audio exceeding or reach a second threshold, the calculation of the context vector may be triggered prior to the first accumulator variable exceeding or reaching the first threshold.

The use of the second threshold to trigger the calculation of the context vector early provides an upper bound on the latency of the speech recognition method, e.g. the latency in decoding is limited to a maximum of the number of frames equal to the second threshold.

The halting probability and the context vector may be calculated using a self-attention decoder layer of a decoder neural network.

The self-attention decoder layer may be a multi-head self-attention decoder layer comprising a plurality of attention heads. The halting probability and the context vector may be calculated using an attention head of the plurality of attention heads.

A respective halting probability may be calculated for each of the other attention heads of the plurality of attention heads.

For each of the other attention heads of the plurality of attention heads, the respective halting probability may be added to the first accumulator variable. In response to the first accumulator variable exceeding or reaching the first threshold, a context vector based on the halting probability and the encoding of the frame of speech audio may be calculated.

There may be a respective accumulator variable for each of the other attention heads, For each of the other attention heads of the plurality of attention heads, the respective halting probability may be added to the respective accumulator variable. In response to the respective accumulator variable exceeding or reaching the first threshold, a context vector may be calculated based on the respective halting probability and the encoding of the frame of speech audio.

In response to a final one or more attention heads of the plurality of attention heads exceeding or reaching the first threshold, the decoding step may be performed. The remainder of the one or more attention heads may have previously exceeded or reached the first threshold.

A combined context vector may be calculated based on the context vectors for each of the plurality of attention heads.

The decoder neural network may include one or more further self-attention decoder layers. A respective combined context vector may be calculated using each of the one or more further self-attention decoder layers.

The calculation of the halting probability may be further based on a preceding context vector.

The encoding of the chunk of speech audio may be by an encoder neural network comprising one or more self-attention encoder layers.

The context vector may be calculated without trimming the halting probabilities.

Not trimming the halting probabilities has the advantage that attention to the last of the encodings is not lost in such a case that the value of the last of the halting probabilities is not small where the accumulator variable has already approached the first threshold.

According to a second embodiment, a computer-implemented method for training a speech recognition system is provided. The method comprises for each training pair of a training set, each training pair comprising a plurality of frames of speech audio and a sequence of training tokens: deriving a sequence of tokens, comprising: initializing an accumulator variable; for each of the plurality of frames of speech audio until the accumulator variable exceeds or reaches a threshold: calculating, by a self-attention decoder layer of a decoder neural network, a halting probability based on an encoding of the respective frame of speech audio, wherein the self-attention decoder layer comprises a first plurality of weights of a greater plurality of weights; adding the halting probability to the accumulator variable; in response to the accumulator variable exceeding or reaching the threshold, calculating a context vector based on the calculated halting probabilities and the encodings of the respective frame of the plurality of frames of speech audio; and performing a decoding step using the context vector to derive a token of the sequence of tokens; and updating a first plurality of weights of a greater plurality of weights based on a difference between the derived sequence of tokens and the training sequence of tokens token in accordance with a loss function.

The context vector may be calculated without trimming the halting probabilities. This may accelerate training of the speech recognition system as revision of the values of halting probabilities, e.g. in a halting probability matrix, may not be performed.

The encoding of the respective frames of the plurality of frames of speech audio may be by an encoder neural network. The encoder neural network includes a second plurality of weights of the greater plurality of weights. The second plurality of weights may be updated based on the difference between the derived sequence of tokens and the training sequence of tokens in accordance with a loss function.

The self-attention decoder layer may be a multi-head self-attention decoder layer. The multi-head self-attention decoder layer may include a plurality of attention heads. The halting probability and the context vector may be calculated using an attention head of the plurality of attention heads.

According to a third embodiment, there is provided a computer program, optionally stored on a non-transitory computer readable medium, which, when the program is executed by a computer, cause the computer to carry out a method according to the first embodiment or the second embodiment.

According to a fourth embodiment, there is provided an apparatus comprising one or more processors. The apparatus is configured to perform a method according to the first embodiment or the second embodiment.

According to a fifth embodiment, there is provided a system for performing speech recognition comprising one or more processors and one or more memories. The one or more processors are configured to: receive a frame of speech audio; encode the frame of speech audio; calculate a halting probability based on the encoding of the frame of speech audio; add the halting probability to a first accumulator variable; in response to the first accumulator variable exceeding or reaching a first threshold, calculate a context vector based on the halting probability and the encoding of the frame of speech audio; perform a decoding step using the context vector to derive a token; and execute a function based on the derived token, wherein the executed function comprises at least one of text output or command performance.

Example Contexts

For the purposes of illustration, example contexts in which the subject innovations can be applied are described in relation to FIGS. 1A-1D. However, it should be understood that these are exemplary, and the subject innovations may be applied in any suitable context, e.g. any context in which speech recognition is applicable.

Voice Assistant System

FIG. 1A is an illustration of a voice assistant system 120 in accordance with example embodiments.

A user 110 may speak a command 112, 114, 116 to the voice assistant system 120. In response to the user 110 speaking the command 112, 114, 116, the voice assistant system performs the command, which may include outputting an audible response.

To receive the spoken command 112, 114, 116, the voice assistant system 120 includes or is connected to a microphone. To output an audible response, the voice assistant system 120 includes or is connected to a speaker. The voice assistant system 120 may include functionality, e.g. software and/or hardware, suitable for recognising the spoken command, performing the command or causing the command to be performed, and/or causing a suitable audible response to be output. Alternatively or additionally, the voice assistant system 120 may be connected via a network, e.g. via the internet and/or a local area network, to one or more other system(s) suitable for recognising the spoken command, causing the command to be performed, e.g. a cloud computing system and/or a local server. A first part of the functionality may be performed by hardware and/or software of the voice assistant system 120 and a second part of the functionality may be performed by the one or more other systems. In some examples, the functionality, or a greater part thereof, may be provided by the one or more other systems where these one or more other systems are accessible over the network, but the functionality may be provided by the voice assistant system 120 when they are not, e.g. due to the disconnection of the voice assistant system 120 from the network and/or the failure of the one or more other systems. In these examples, the voice assistant system 120 may be able to take advantage of the greater computational resources and data availability of the one or more other systems, e.g. to be able to perform a greater range of command commands, to improve the quality of speech recognition, and/or to improve the quality of the audible output, while still being able to operate without a connection to the one or more other systems.

For example, in the command 112, the user 110 asks "What is X?". This command 112 may be interpreted by the voice assistant system 120 as a spoken command to provide a definition of the term X. In response to the command, the voice assistant system 120 may query a knowledge source, e.g. a local database, a remote database, or another type of local or remote index, to obtain a definition of the term X. The term X may be any term for which a definition can be obtained. For example, the term X could be a dictionary term, e.g. a noun, verb or adjective; or an entity name, e.g. the name of a person or a business. When the definition has been obtained from the knowledge source, the definition may be synthesised into a sentence, e.g. a sentence in the form of "X is [definition]". The sentence may then be converted into an audible output 112, e.g. using text-to-speech functionality of the voice assistant system 120, and output using the speaker included in or connected in the voice assistant system 120.

As another example, in the command 114, the user 110 says "Turn Off Lights". The command 114 may be interpreted by the voice assistant system as a spoken command to turn off one or more lights. The command 114 may be interpreted by the voice assistant system 120 in a context sensitive manner. For example, the voice assistant system 120 may be aware of the room in which it is located and turn off the lights in that room specifically. In response to the command, the voice assistant system 120 may cause one or more lights to be turned off, e.g. cause one or more smart bulbs to no longer emit light. The voice assistant system 120 may cause the one or more lights to be turned off by directly interacting with the one or more lights, e.g. over a wireless connection, such as a Bluetooth connection, between the voice assistant system and the one or more lights; or by indirectly interacting with the lights, e.g. sending one or more messages to turn the lights off to a smart home hub or a cloud smart home control server. The voice assistant system 120 may also produce an audible response 124, e.g. a spoken voice saying 'lights off', confirming to the user that the command has been heard and understood by the voice assistant system 120.

As an additional example, in the command 116, the user 110 says "Play Music". The command 116 may be interpreted by the voice assistant system as a spoken command to play music. In response to the command, the voice assistant system 120 may: access a music source, such as local music files or a music streaming service, stream music from the music source, and output the streamed music 126 from the speaker included in or connected to the voice assistant system 120. The music 126 outputted by the voice assistant system 120 may be personalised to the user 110. For example, the voice assistant system 120 may recognise the user 110, e.g. by the properties of the voice of user 110, or may be statically associated with the user 110, then resume the music previously played by the user 110 or play a playlist personalised to the user 110.

Speech Transcription System

Figure 1B:
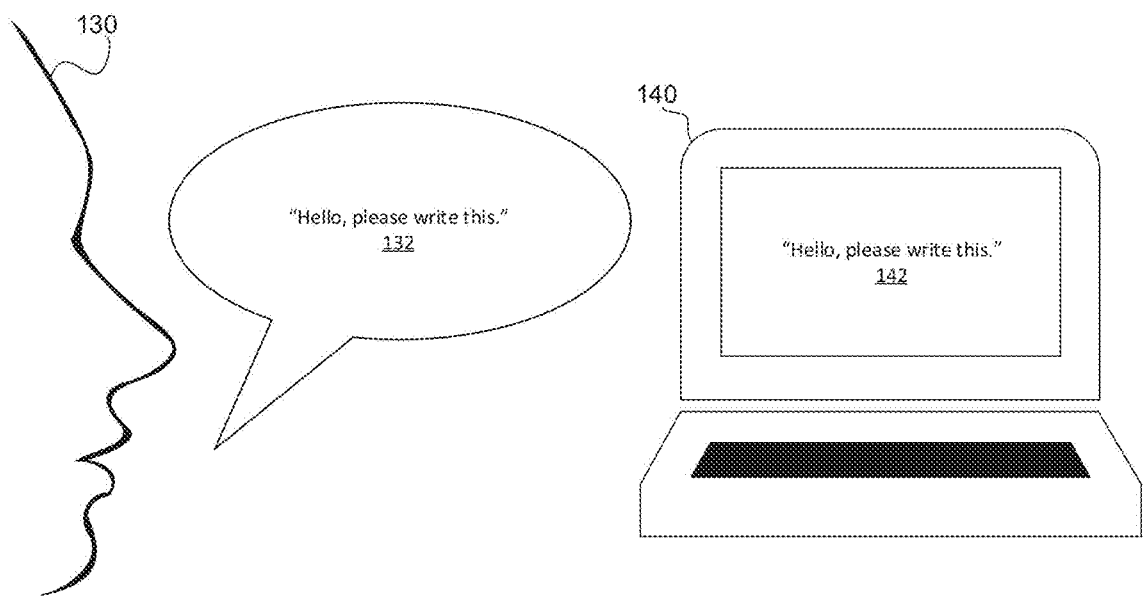
FIG. 1B is an illustration of a speech transcription system in accordance with example embodiments.

FIG. 1B is an illustration of a speech transcription system in accordance with example embodiments.

A user 130 may speak to a computer 140. In a response to the user speaking, the computer 140 produces a textual output 142 representing the content of the speech 132.

To receive the speech, the computer 140 includes or is connected to a microphone. The computer 140 may include software suitable for recognising the content of the speech audio and outputting text representing the content of the speech, e.g. transcribe the content of the speech. Alternatively or additionally, the computer 140 may be connected via a network, e.g. via the internet and/or a local area network, to one or more other system(s) suitable for recognising the content of the speech audio and outputting text representing the content of the speech. A first part of the functionality may be performed by hardware and/or software of the computer 140 and a second part of the functionality may be performed by the one or more other systems. In some examples, the functionality, or a greater part thereof, may be provided by the one or more other systems where these one or more other systems are accessible over the network, but the functionality may be provided by the computer 140 when they are not, e.g. due to the disconnection of the computer 140 from the network and/or the failure of the one or more other systems. In these examples, the computer 140 may be able to take advantage of the greater computational resources and data availability of the one or more other systems, e.g. to improve the quality of speech transcription, while still being able to operate without a connection to the one or more other systems.

The outputted text 142 may be displayed on a display included in or connected to the computer 140. The outputted text may be input to one or more computer programs running on the computer 140, e.g. a word processing computer program or a web browser computer program.

Voice Assistance Method

Figure 1C:
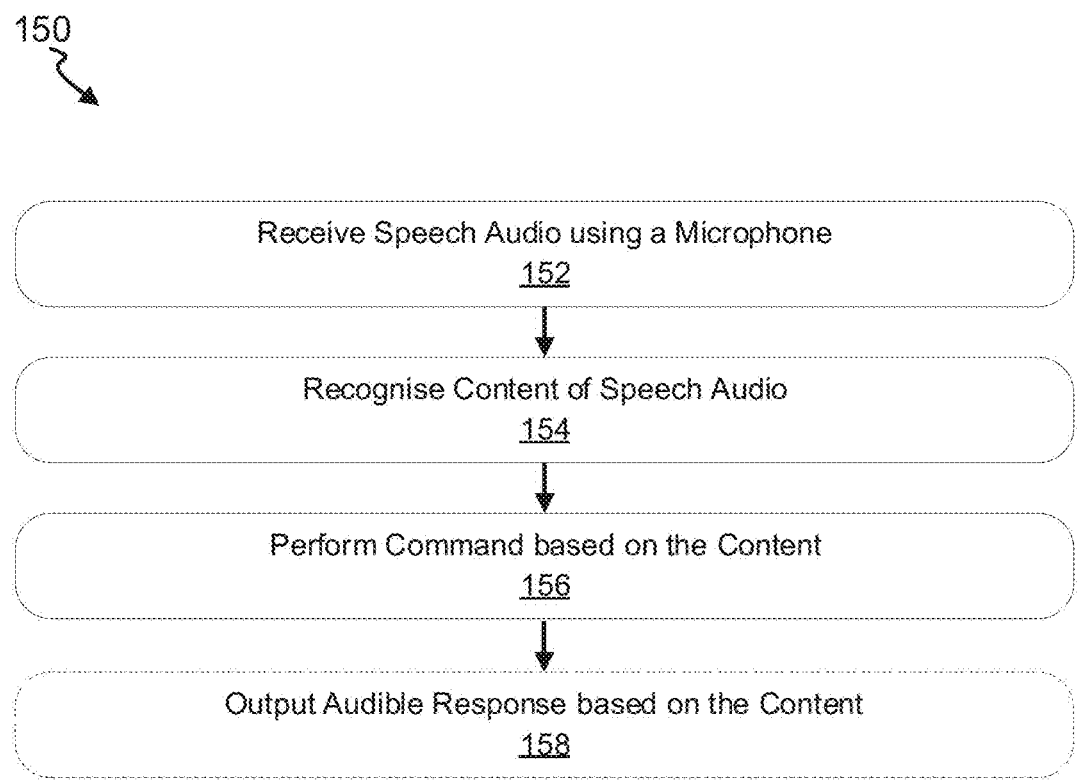
FIG. 1C is a flow diagram of a method for performing voice assistance in accordance with example embodiments.

FIG. 1C is a flow diagram of a method 150 for performing voice assistance in accordance with example embodiments. Optional steps are indicated by dashed lines. The example method 150 may be implemented as one or more computer-executable instructions executed by one or more computing devices, e.g. the hardware 700 described in relation to FIG. 7. The one or more computing devices may be or include a voice assistant system, e.g. the voice assistant system 120, and/or may be integrated into a multi-purpose computing device, such as a desktop computer, laptop computer, smartphone, smart television, or games console.

In step 152, speech audio is received using a microphone, e.g. a microphone of a voice assistant system or a microphone integrated into or connected to a multi-purpose computing device. As the speech audio is received, the speech audio may be buffered in a memory, e.g. a memory of a voice assistant system or a multi-purpose computing device.

In step 154, the content of the speech audio is recognised. The content of speech audio may be recognised using methods described herein, e.g. the method 200 of FIG. 2, the method 300A of FIG. 3A, or the method 300B of FIG. 3B. Prior to the use of such methods, the audio may be pre-processed, e.g. using the method 600 of FIG. 6 or aspects thereof. The recognised content of the speech audio may be text, syntactic content, and/or semantic content. The recognised content may be represented using one or more vectors. Additionally, e.g. after further processing, or alternatively, the recognised content may be represented using one or more tokens. Where the recognised content is text, each token and/or vector may represent a character, a phoneme, a morpheme or other morphological unit, a word part, or a word.

In step 156, a command is performed based on the content of the speech audio. The performed command may be, but is not limited to, any of the commands 112, 114, 116 described in relation to FIG. 1A, and may be performed in the manner described. The command to be performed may be determined by matching the recognised content to one or more command phrases or command patterns. The match may be approximate. For example, for the command 114 which turns off lights, the command may be matched to phrases containing the words "lights" and "off", e.g. "turn the lights off" or "lights off". The command 114 may also be matched to phrases that approximately semantically correspond to "turn the lights off", such as "close the lights" or "lamp off".

In step 158, an audible response is output based on the content of the speech audio, e.g. using a speaker included in or connected to a voice assistant system or multi-purpose computing device. The audible response may be any of the audible responses 122, 124, 126 described in relation to FIG. 1A, and may be produced in the same or a similar manner to that described. The audible response may be a spoken sentence, word or phrase; music; or another sound, e.g. a sound effect or alarm. The audible response may be based on the content of the speech audio in itself and/or may be indirectly based on the content of the speech audio, e.g. be based on the command performed, which is itself based on the content of the speech audio.

Where the audible response is a spoken sentence, phrase or word, outputting the audible response may include using text-to-speech functionality to transform a textual, vector or token representation of a sentence, phrase or word into spoken audio corresponding to the sentence, phrase or word. The representation of the sentence or phrase may have been synthesised on the basis of the content of the speech audio in itself and/or the command performed. For example, where the command is a definition retrieval command in the form "What is X?", the content of the speech audio includes X, and the command causes a definition, [def] to be retrieve from a knowledge source. A sentence in the form "X is [def]" is synthesised, where X is from the content of the speech audio and [def] is content retrieved from a knowledge source by the command being performed.

As another example, where the command is a command causing a smart device to perform a function, such as a turn lights off command that causes one or more smart bulbs to turn off, the audible response may be a sound effect indicating that the function has been or is being performed.

As indicated by the dashed lines in the figures, the step of producing an audible response is optional and may not occur for some commands and/or in some implementations. For example, in the case of a command causing a smart device to perform a function, the function may be performed without an audible response being output. An audible response may not be output, because the user has other feedback that the command has been successfully completed, e.g. the light being off.

Speech Transcription Method

Figure 1D:
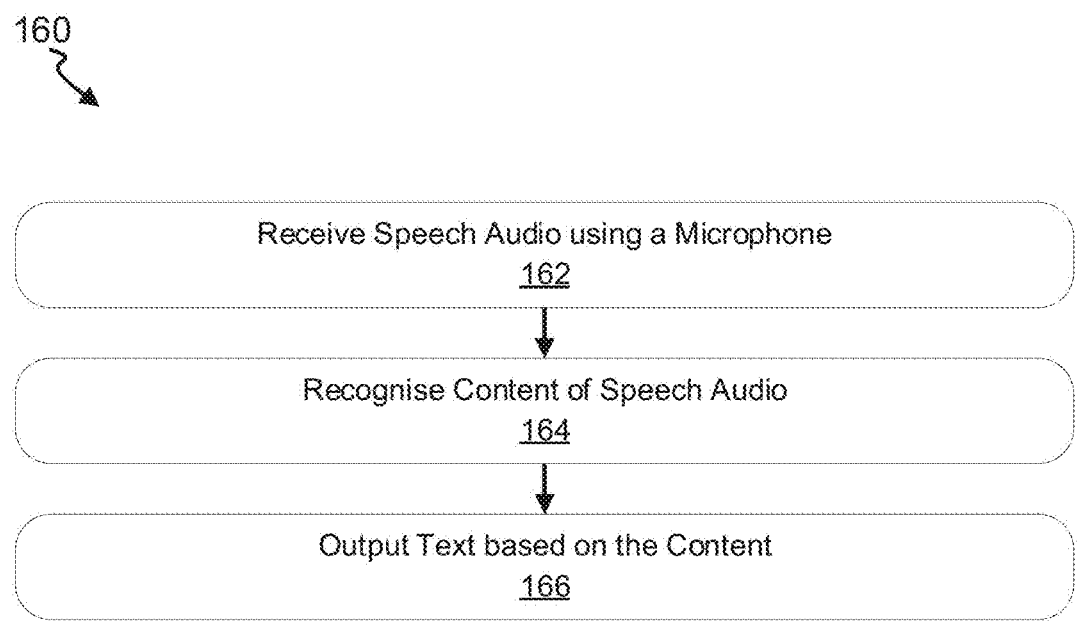
FIG. 1D is a flow diagram of a method for performing speech transcription in accordance with example embodiments.

FIG. 1D is a flow diagram of a method 160 for performing speech transcription in accordance with example embodiments. The example method 160 may be implemented as one or more computer-executable instructions executed by one or more computing devices, e.g. the hardware 700 described in relation to FIG. 7. The one or more computing devices may be a computing device, such as a desktop computer, laptop computer, smartphone, smart television, or games console.

In step 162, speech audio is received using a microphone, e.g. a microphone integrated into or connected to a computing device As the speech audio is received, the speech audio may be buffered in a memory, e.g. a memory of a computing device.

In step 164, the content of the speech audio is recognised. The content of speech audio may be recognised using methods described herein, e.g. the method 200 of FIG. 2, the method 300A of FIG. 3A, or the method 300B of FIG. 3B. Prior to the use of such methods, the audio may be pre-processed, e.g. using the method 600 of FIG. 6 or aspects thereof. The recognised content of the speech audio may be textual content, syntactic content, and/or semantic content. The recognised content may be represented using one or more vectors. Additionally, e.g. after further processing, or alternatively, the recognised content may be represented using one or more tokens. Where the recognised content is text, each token and/or vector may represent a character, a phoneme, a morpheme or other morphological unit, a word part, or a word.

In step 166, text is output based on the content of the speech audio. Where the recognised content of the speech audio is textual content, the outputted text may be the textual content, or may be derived from the textual content as recognised. For example, the textual content may be represented using one or more tokens, and the outputted text may be derived by converting the tokens into the characters, the phonemes, the morphemes or other morphological units, word parts, or words that they represent. Where the recognised content of the speech audio is or includes semantic content, output text having a meaning corresponding to the semantic content may be derived. Where the recognised content of the speech audio is or includes syntactic content, output text having a structure, e.g. a grammatical structure, corresponding to the syntactic content may be derived.

The outputted text may be displayed. The outputted text may be input to one or more computer programs, such as a word processor or web browser. Further processing may be performed on the outputted text. For example, spelling and grammar errors in the outputted text may be highlighted or corrected. In another example, the outputted text may be translated, e.g. using a machine translation system.

Speech Recognition Method

Figure 2:
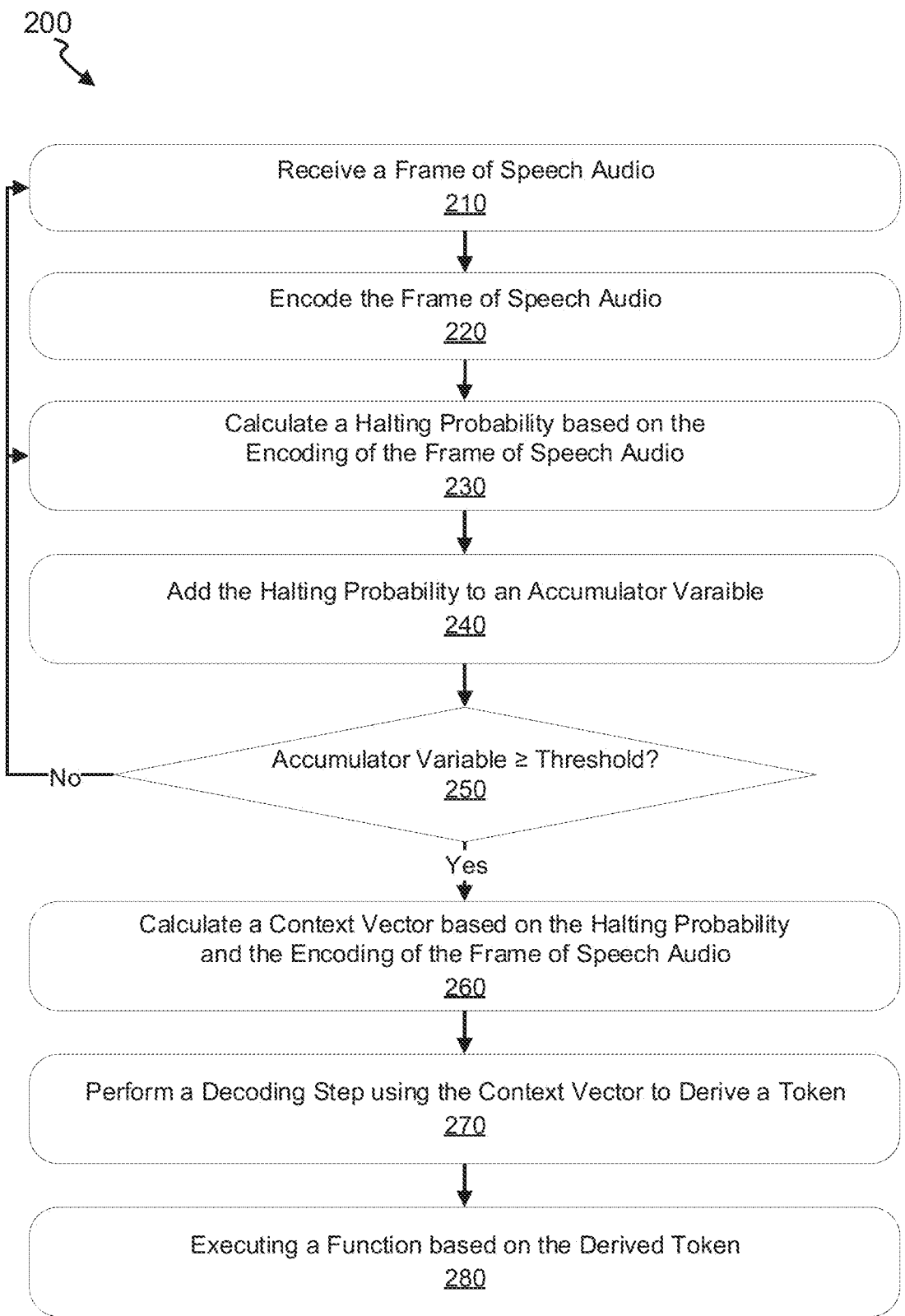
FIG. 2 is a flow diagram of a method for speech recognition in accordance with example embodiments.

FIG. 2 is a flow diagram of a method 200 for performing speech recognition in accordance with example embodiments. The example method 200 may be implemented as one or more computer-executable instructions executed by one or more computing devices, e.g. the hardware 700 described in relation to FIG. 7.

In step 210, a frame of speech audio is received. Speech audio, e.g. audio of a voice of a user, may be received using a sound capture apparatus, e.g. a microphone. The speech audio may be pre-processed to extract the frame of speech audio from the speech audio. Each frame of speech audio may have been pre-processed prior to being received, e.g. using the method 600 described in relation to FIG. 6 or aspects thereof. The frame of speech audio may be received as part of a plurality of frames of speech audio. A frame of speech audio may also be referred to as a window of speech audio. The window of speech audio may be a 25 ms window of speech audio. The window. The plurality of frames of speech audio may be referred to as a chunk of speech audio.

In step 220, the frame of speech audio is encoded. The frame of speech audio may be encoded using an encoder neural network, e.g. a self-attention encoder neural network, and/or another type of machine-learned encoder, e.g. a kernel method encoder, such as a decision tree encoder or a Gaussian process encoder. Alternatively or additionally, the frame of speech audio may be encoded using a programmed encoder and/or encoding method. For example, the frame of speech audio may be encoded using an algorithm such as a fast Fourier transform algorithm.

In particular, the frame of speech audio may be encoded as part of a plurality of frames of speech audio, e.g. as part of a chunk of speech audio. Each frame of the plurality of frames of speech audio may be encoded simultaneously, e.g. each frame of chunk of speech audio may be encoded simultaneously. The chunk of speech audio may be encoded using a self-attention encoder 510 as described in relation to FIG. 5.

In step 230, a halting probability is calculated based on the encoding of the frame of speech audio. The halting probability may be calculated using an energy function. The energy function may be used to calculate an energy. An example of an energy function is a monotonic attention energy function to calculate a monotonic attention energy. The monotonic attention energy may be calculated as:

$$e_{i,j} = \frac{q_i - 1k_j^T}{\sqrt{d_k}} \quad \text{(Equation 1)}$$

where $e_{i,j}$ is the monotonic attention energy for the current output step i, for the encoding timestep j corresponding to the frame of speech audio. $q_{i-1}$ is a preceding context vector, e.g. a context vector produced in a preceding output step. The preceding context vector $q_{i-1}$ may also be referred to as the decoder state. $k_j$ is the encoding of the frame of speech audio. $d_k$ is the dimensionality, e.g. the number of elements, of the encoding of the frame of speech audio.

The halting probability may be a rescaling of the calculated energy, e.g. a rescaling of the calculated energy into a value between 0 and 1. The rescaling may be performed using a rescaling function, e.g. a sigmoid function, such as the logistic function. For example, the halting probability $p_{i,j}$ may be a sigmoid of the monotonic attention energy:

$$p_{i,j} = \sigma(e_{i,j}) \quad \text{(Equation 2)}$$

In step 240, the halting probability is added to an accumulator variable. The accumulator variable may have been previously initialized. For example, the accumulator variable may have been initialized to zero or another initial value. Halting probabilities calculated for one or more preceding frames of audio may have been previously added to the accumulator variable. The accumulator variable may be a sum of the halting probabilities and the halting probabilities for the preceding one or more frames of speech audio.

In step 250, it is determined whether the accumulator variable is greater than a threshold. The threshold may be any suitable value. For example, the threshold may be 1, or another positive integer, H.

If the accumulator variable is not greater than the threshold then the method returns to a previous step of the method 200. If is a next frame of speech audio has already been received and encoded, e.g. the next frame of speech audio was encoded as part of a same chunk, then the method returns to step 230. If a next frame of speech audio has not been received, e.g. because the next frame of speech audio is in a next chunk of speech audio, then the method returns to step 210.

If the accumulator variable is greater than the threshold, then the method proceeds to step 260.

In step 260, a context vector is calculated based on the halting probability and the encoding of the frame of speech audio. The context vector, $c_i$, for the current output step, i, may be calculated as:

$$c_i = \Sigma_{j=1}^T p_{i,j} k_j \quad \text{(Equation 3)}$$

where $p_{i,j}$ is the halting probability for the current decoding step i and the encoding timestep j. $k_j$ is the encoding of the frame of speech audio for the jth encoding timestep. T is the number of encoding timesteps up to the present encoding timestep. $k_T$ is the encoding of the frame of speech audio encoded in step 230, and $p_{i,T}$ is the halting probability calculated in step 240. The halting probabilities be used to calculate the context vector without trimming the halting probabilities, e.g. one or more of the halting probabilities are not modified such that the halting probabilities sum to the first threshold, e.g. one. Not trimming the halting probabilities has the advantage that attention to the last of the encodings is not lost in such a case that the value of $p_{i,t}$, is not small where the accumulator variable has already approached the first threshold, e.g. one.

In step 270, a decoding step is performed using the context vector to derive a token. As will be described in relation to the following figures, performing the decoding step may include calculating further context vectors and calculating a combined context vector. Performing the decoding step may also include processing the context vector or a combined context vector using one or more linear layers. Performing the decoding step may also include processing the context vector, combined context vector, or output of the one or more linear layers with a classification layer. The output of the classification layer may be a plurality of probabilities or scores, e.g. a vector of probabilities or scores, with each probability or score indicating the likelihood that a given token is correct. The classification layer may be a cross entropy layer, a softmax layer, or a variation or equivalent thereof. The derived token may be the token having the greatest corresponding probability or score or may be selected probabilistically based on the probabilities or scores, e.g. tokens having greater probabilities or scores being more likely to be selected. The probabilities or scores may be used in conjunction with a joint decoder which also utilizes a language model, which outputs probabilities or scores for each token based on tokens that have been previously output. Such a joint decoder may calculate joint probabilities or scores based on both the language model probabilities or scores and the classification layer probabilities or scores. The token may then be derived as the token having the greatest combined probability or score, may be selected probabilistically based on the combined probabilities or scores, e.g. tokens having greater combined probabilities or scores being more likely to be selected.

In step 280, a function is executed based on the derived token. The executed function includes at least one of command performance and/or text output. Examples and implementations of command performance are described in relation to FIG. 1A and FIG. 1C. Examples and implementations of text output are described in relation to FIG. 1B and FIG. 1D.

First Decoding Method

FIG. 3A is a flow diagram of a method 300A which is a first variation of a decoding method for speech recognition in accordance with example embodiments. The example method 300B may be implemented as one or more computer-executable instructions executed by one or more computing devices, e.g. the hardware 700 described in relation to FIG. 7.

For each self-attention head of each self-attention decoder layer of a decoder neural network, the following are performed. An initialization step 310A is performed. Then, for each frame of speech audio of a plurality of frames of speech audio until the accumulator variable exceeds or reaches a first threshold or a count of frames of speech audio exceeds or reaches a second threshold, a probability calculation step 320A and an accumulation step 330A are performed. This number of frames of speech audio for which a halting probability is calculated before the context vector is calculated may be referred to as the number of adaptive computation steps, $N_i$, which may be defined as:

$$N_i = \min\left\{\min\left\{n : \sum_{j=1}^{n} p_{i,j} > 1\right\}, M\right\} \quad \text{(Equation 4)}$$

where, in this case, 1 is the first threshold and M is the second threshold, which may also be referred to as the maximum look-ahead step. This defines a maximum number of frames of speech audio that may be processed before a context vector is calculated and a decoding step is performed in cases where the accumulator variable does not exceed one.

After one of the first threshold or second threshold is exceeded or reached, a context vector calculation step 340A is performed.

In the initialization step 310A, a respective accumulator variable is initialized. The respective accumulator variable may be initialized to zero or another initial value. The respective accumulator variable for each of the self-attention head of each self-attention head may be initialized to the same value, e.g. 0.

In the probability calculation step 320A, a halting probability is calculated based on an encoding of the frame of speech audio. The halting probability may be calculated in the manner described in relation to step 230.

In the addition step 330A, the halting probability is added to the respective accumulator variable, i.e. the accumulator variable for the respective self-attention head.

In the context vector calculation step 340A, a context vector is calculated based on the halting probabilities and the encodings. The context vector may be calculated in the same manner as described in relation to step 260.

Then, for each self-attention decoder layer of the decoder neural network, a combination step 350A is performed. In combination step 350A, a combined context vector is calculated based on the context vectors for each of the self-attention heads. The combination step 350A, and consequently the steps following, may be performed where the accumulator variables for each of the self-attention heads have reached the first threshold, e.g. when accumulator variables for a final one or more attention heads of the plurality of attention heads exceeding or reaching the first threshold, with the remainder of the one or more attention heads having previously exceeded or reached the first threshold. If this does not occur, the combination step 350A occurs when the count of frames reaches the second threshold. The combined context vectors may be a concatenation of the context vectors for each self-attention head multiplied by a matrix including a plurality of weights, e.g. a projection matrix. The combined context vector $c_{combined}$ may be calculated using the following equation:

$$c_{combined} = \text{Concat}(\text{head}_1, \ldots, \text{head}_H) W^O \quad \text{(Equation 5)}$$

where $\text{head}_h$ is the context vector for the hth head, H is the number of heads, and $W_O$ is a projection matrix including one or more weights. $W_O \in R_{d_m \times d_m}$ where $d_m = H \times d_k$, where $d_k$ is the dimensionality of, e.g. the number of elements in, each context vector.

Finally, a decoding step 360 is performed. In the case, where there are multiple self-attention decoder layers, the decoding step may be performed when each of the combination steps 350 for each of the self-attention decoder layers have been performed, hence, after the earlier of the accumulator variable for each self-attention head for each self-attention decoder layer exceeding or reaching or the count of frames reaching the second threshold. In the decoding step 360, the decoding step uses at least one of the combined context vectors to derive a token. The decoding step may be performed to derive the token in the manner described in relation to step 270 using the at least one of the combined context vectors. For example, the at least one of the combined context vectors may be processed using one or more linear layers and/or one or more classification layers, and may be decoded using a joint decoder.

The method described above may be described as decoder adaptive computation steps (DACS) and used for automatic speech recognition in a Transformer neural network architecture. The equations described above may be rewritten in a matrix format and generalised to all of the self-attention heads as follows.

$$P = \text{sigmoid}\left(\frac{QK^T}{\sqrt{d_k}}\right) \quad \text{(Equation 6)}$$

$$M = \text{ShiftRight}(\text{cumsum}(P) > 1) \quad \text{(Equation 7)}$$

$$DACS(Q, K, V) = M \odot PV \quad \text{(Equation 8)}$$

$P, M \in R^{L \times T}$ are the halting probability matrix and the corresponding halting mask, where $Q \in R^{L \times d_k}$ and $K, V \in R^{T \times d_k}$ denote queries, keys and values in the matrix form. Q is the decoder state, e.g. the previous context vector(s), and K, V are the same as the encoder states, where the term inside the sigmoid function in eq. (1) is referred to as attention energy $E \in R^{L \times T}$. In equation 7, the cumulative summation function cumsum(x)=$x_1$, $x_1+x_2$, $x_1+x_2+x_3$, . . . , $\Sigma_{k=1}^{|x|} x_k$], and the right-shift operator ShiftRight(x)=[$\mathbf{0},x_1,x_2$, . . . ,$x_{|x|-1}$] are both applied to the rows of P.

The method may also be described by way of pseudocode as follows:

---
Algorithm 1: DACS Inference for Transformer ASR
---

Input: encoder states k(v), decoder states q, length T, maximum look-ahead step M, number of heads H, number of decoder layers $N_d$.

1 Initialization: $y_0 = \langle sos \rangle$, $t_0 = 0$
2 while $y_{i-1} \neq \langle eos \rangle$ do
3   | $t_i = t_{i-1}$
4   | for l = 1 to $N_d$ do
5   |   | $t_i^l = t_i$
6   |   | for h = 1 to H do
7   |   |   | $acc_i^{h,l} = 0$
8   |   |   | for j = 1 to min($t_{i-1}$ + M, T) do
9   |   |   |   | $p_{i,j}^{h,l} = \text{sigmoid}\left(\frac{q_i^{h,l} k_j^T}{\sqrt{d_k}}\right)$
10   |   |   |   | $acc_i^{h,l}$ += $p_{i,j}^{h,l}$
11   |   |   |   | if $acc_i^{h,l} > 1$ then
12   |   |   |   |   | break
13   |   |   |   | end
14   |   |   | end
15   |   |   | $c_i^{h,l} = \Sigma_{m=1}^{j} p_{i,m}^{h,l} v_m^{h,l}$
16   |   |   | $t_i^l = \max(t_i^l, j)$
17   |   | end
18   |   | $c_i^l = \text{Concat}(c_i^{1,l}, \ldots, c_i^{H,l})$
19   |   | $t_i = \max(t_i, t_i^l)$
20   | end
21   | i += 1
22 end where <sos> is a token representing a start of the sentence, <eos> is a token representing an end of a sentence, and $acc_i^{h,l}$ is the accumulator variable for the hth head of the lth layer for the ith decoding step.

Second Decoding Method

FIG. 3B is a flow diagram of a method 300B which is a second variation of a decoding method for speech recognition in accordance with example embodiments. The example method 300B may be implemented as one or more computer-executable instructions executed by one or more computing devices, e.g. the hardware 700 described in relation to FIG. 7.

For each self-attention decoder layer of a decoder neural network, the following are performed. An initialization step 310B is performed. In the initialization step 310B, a shared accumulator variable is initialized for the respective self-attention decoder layer. The accumulator variable is described as a shared accumulator variable, because each self-attention head of the respective self-attention decoder layer operates on that shared accumulator variable Then, for each frame of speech audio until the shared accumulator variable exceeds or reaches a first threshold or a count of frames of speech audio exceeds or reaches a second threshold, a probability calculation step 320B and an addition step 330B are performed for each self-attention head of the respective self-attention decoder layer. The first threshold may be the number of self-attention heads, H, or may be a value less than the number of self-attention heads, e.g. two. The number of frames of speech audio for which a halting probability is calculated before the context vector is calculated for a given self-attention decoder layer l may be referred to as the number of adaptive computation steps, $N_i^l$, which may be defined as:

$$N_i^l = \min\left\{\min\left\{n: \sum_{j=1}^{n} p_{i,j}^l > H\right\}, M\right\} \quad \text{(Equation 9)}$$

where, in this case, H is the first threshold and number of self-attention heads, and M is the second threshold, which may also be referred to as the maximum look-ahead step. Then, a context vector calculation step 340B and a combination step 350B are performed.

A benefit of using a shared accumulator variable, and, hence a shared condition and first threshold, is that the last frame of speech audio for which a halting probability is calculated and a context vector calculated, e.g. the halting position, is the same for each of the attention heads, so no synchronisation is required. The sum of halting probabilities calculated by each head is not capped at a respective threshold, e.g. one. Instead, the active heads could account for more attention confidence that is compromised by the inactive ones, which effectively helps reduce the loss of attention beyond the joint halting position.

In the probability calculation step 320B, a halting probability is calculated based on an encoding of the frame of speech audio. The halting probability may be calculated in the same manner as described in step 230.

In the addition step 330B, the halting probability is added to the shared accumulator variable.

In the context vector calculation step 340B, a context vector is calculated based on the halting probabilities and the encodings. The context vector calculation step may be performed in the same manner as described in relation to step 260.

Then, for each self-attention decoder layer of the decoder neural network, a combination step 350B is performed. In combination step 350B, a combined context vector is calculated based on the context vectors for each of the self-attention heads. The combined context vector may be calculated in the same manner as described in relation to step 350A.

Finally, a decoding step 360B is performed. In the decoding step 360B, the decoding step uses at least one of the combined context vectors to derive a token. The decoding step may be performed in the same manner as described in relation to the step 360A.

The method may also be described by way of pseudocode as follows:

---
Algorithm 1: HS-DACS Inference for Transformer ASR
---

Input: encoder states k(v), decoder states q, length T, maximum look-ahead step M, number of heads H, number of decoder layers $N_d$.

1 Initialization: $y_0 = \langle sos \rangle$, $t_0 = 0$
2 while $y_{i-1} \neq \langle eos \rangle$ do
3   | for l = 1 to $N_d$ do
4   |   | $acc_i^{h,l} = 0$
5   |   | for j = 1 to min($t_{i-1}$ + M, T) do
6   |   |   | for h = 1 to H do
7   |   |   |   | $p_{i,j}^{h,l} = \text{sigmoid}\left(\frac{q_i^{h,l} k_j^T}{\sqrt{d_k}}\right)$ -continued Algorithm 1: HS-DACS Inference for Transformer ASR

```
8    |    |    |    |    acc_i^{h,l} += p_{i,j}^{h,l}
9    |    |    |    end
10   |    |    |    if acc_i^{h,l} > H then
11   |    |    |    |    break
12   |    |    |    end
13   |    |    end
14   |    |    for h = 1 to H do
15   |    |    |    c_i^{h,l} = Σ_{m=1}^{j} p_{i,m}^{h,l} v_m^{h,l}
16   |    |    end
17   |    |    c_i^l = Concat(c_i^{1,l}, . . . , c_i^{H,l})
18   |    |    t_i = max(t_i, j)
19   |    end
20   |    i += 1
21   end
``` where <sos> is a start of sentence state and <eos> is an end of sentence state.

Speech Recognition System Training Method

Figure 4A:
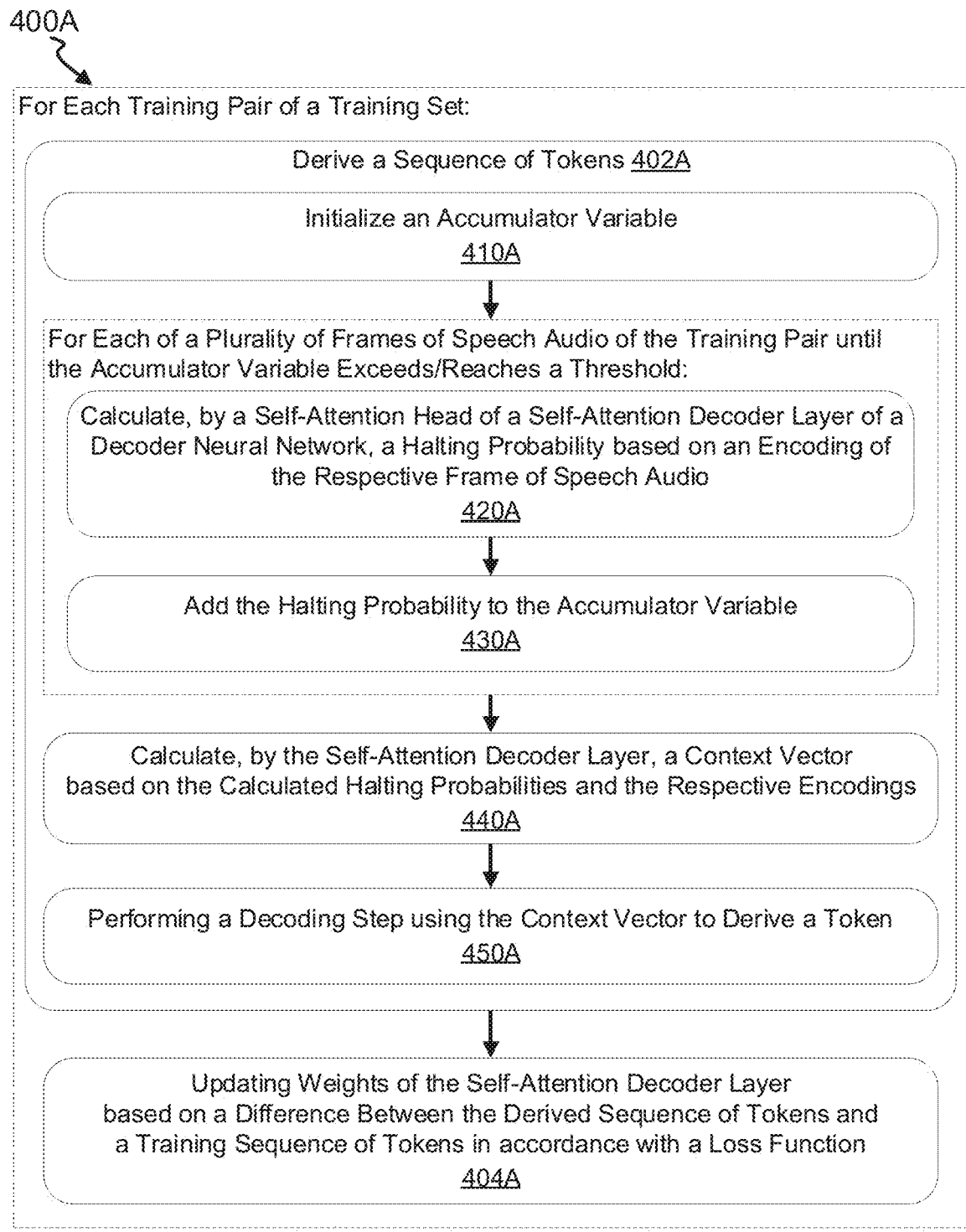
FIG. 4A is a flow diagram of a method for training a speech recognition system in accordance with example embodiments.

FIG. 4A is a flow diagram of a method 400A for performing speech recognition in accordance with example embodiments. The example method 400 may be implemented as one or more computer-executable instructions executed by one or more computing devices, e.g. the hardware 700 described in relation to FIG. 7.

The following steps are performed for each training pair of a training set. Each training pair includes a plurality of frames of speech audio and a sequence of training tokens. The training sequence of tokens may also be described as a gold standard sequence or reference sequence. The training sequence of tokens may have be or be derived from an indication by a human of the contents of an utterance to which the plurality of frames of speech audio correspond. For example, a sequence of tokens representing the word, phrase(s) or sentence(s).

In step 402A, a sequence of tokens is derived based on the plurality of frames of speech audio. A token of the sequence of tokens may be derived using the steps 410A-450A. Where the sequence of tokens includes a plurality of tokens, further tokens of the sequence of tokens may be arrived by applying the steps 410A-450A to remaining frames of the plurality of frames of speech audio.

In an initialization step 410A, an accumulator variable is initialized. The accumulator variable may be initialized to zero or another initial value. The accumulator variable may be a respective accumulator variable for a given self-attention head of a self-attention decoder layer or the accumulator variable may be a shared accumulator variable for a self-attention decoder layer.

Then, for each frame of a plurality of frames of speech audio of the training pair until the accumulator variable exceeds or reaches a threshold, a probability calculation step 420A and an addition step 430A are performed.

In the probability calculation step 420A, a halting probability is calculated, by a self-attention decoder layer of a decoder neural network, based on an encoding of the respective frame of speech audio. The self-attention decoder layer includes a first plurality of weights of a greater plurality of weights. The self-attention decoder layer may be a multi-head attention layer including a plurality of self-attention heads and the halting probability may be calculated by a self-attention head of the plurality of self-attention heads. The halting probability may be calculated in the manner described in step 230.

In the addition step 430A, the halting probability is added to the accumulator variable. Then, in a context vector calculation step 440A, a context vector is calculated based on the calculated halting probabilities and the respective encodings, e.g. the encodings of the frames of speech audio for which halting probabilities were calculated. The context vector may be calculated in the manner described in relation to step 260. As in step 260, the halting probabilities be used to calculate the context vector without trimming the halting probabilities, e.g. one or more of the halting probabilities are not modified such that the halting probabilities sum to the first threshold, e.g. one. This may accelerate training of the speech recognition system as revision of the values of halting probabilities, e.g. in a halting probability matrix, may not be performed, whereas such revision is performed if the probabilities were to be trimmed. Hence, computational resource usage in training is reduced.

Then, a decoding step 450A is performed. In the decoding step 450A, the context vector is used to derive a token. The decoding step may be performed in the manner described in relation to step 270.

In an update step 404A, the first plurality of weights are updated based on a difference between the derived sequence of tokens and the training sequence of tokens in accordance with a loss function. Further weights of the greater plurality of weights may also be updated. For example, weights for one or more other self-attention decoder layers or other layer types, e.g. linear layer, of a decoder may also be updated. Other weights of the greater plurality of weights which relate to other parts of the speech recognition system may also be updated. For example, the encodings of each frame of speech audio may also be generated using an encoder including a second plurality of weights of the greater plurality of weights. The second plurality of weights may also be updated based on the difference between the derived sequence of tokens and the training sequence of tokens in accordance with a loss function. Weights may be updated using backpropagation.

The loss function may be a cross-entropy loss function. The loss function may include a Connectionist Temporal Classification (CTC) component. The loss function may be a multi-objective loss function including a cross-entropy component and a CTC component. A cross-entropy loss function of the multi-objective loss function may be used to update the first plurality of weights and other weights of the decoder. A cross-entropy loss function of the multi-objective loss function may be used to update the second plurality of weights in the encoder. A CTC loss function of the multi-objective loss function may be used to update the second plurality of weights in the encoder.

For the purposes of ease of explanation, update step 404A has been described as occurring for each training pair. However, it should be noted that in some variations, the update step 404A may occur for only some of the training pairs, e.g. for every Nth training pair. In these cases, the update of the weights is based on the difference between each of N derived sequences of tokens and corresponding training sequence of tokens since the last update, and may be calculated in accordance with a loss function. For example, the update may be based on average of the losses calculated for each of the derived sequences of tokens and corresponding training sequences of tokens. Such methods for updating the weights may be referred to as batch update or mini-batch methods.

First Variation of Speech Recognition System Training Method

FIG. 4B is a flow diagram of a method 400B which is a first variation of a method for training a speech recognition system. The example method 400B may be implemented as one or more computer-executable instructions executed by one or more computing devices, e.g. the hardware 700 described in relation to FIG. 7.

The following steps are performed for each training pair of a training set. Each training pair includes a plurality of frames of speech audio and a sequence of training tokens. The training sequence of tokens may also be described as a gold standard sequence or reference sequence. The training sequence of tokens may have be or be derived from an indication by a human of the contents of an utterance to which the plurality of frames of speech audio correspond. For example, a sequence of tokens representing the word, phrase(s) or sentence(s)

In step 402B, a sequence of tokens is derived based on the plurality of frames of speech audio. A token of the sequence of tokens may be derived using the steps 410B-450B. Where the sequence of tokens includes a plurality of tokens, further tokens of the sequence of tokens may be arrived by applying the steps 410B-450B to remaining frames of the plurality of frames of speech audio.

For each self-attention head of each self-attention decoder layer of a decoder neural network, an initialization step 410B is performed. In the initialization step 410B, an accumulator variable is initialized for the respective self-attention head.

For each self-attention head of each self-attention decoder layer, a probability calculation step 420B and an addition step 430B are performed for each of a plurality of frames of speech audio of the training pair until the respective accumulator variable for the self-attention head exceeds or reaches a threshold, e.g. a threshold of 1. A threshold for the count of frames, e.g. the second threshold described in relation to FIG. 3A and FIG. 3B, may not be applied during training, as not applying such a threshold for the count of frames may speed up matrix computations. Then, for each self-attention head, a context vector calculation step 440B is performed.

In the probability calculation step 420B, a halting probability is calculated for the respective self-attention head. The halting probability may be calculated in the manner described in step 230.

In the addition step 430B, the halting probability is added to the accumulator variable for the respective self-attention head.

Then, in a context vector calculation step 440B, a context vector, for the respective self-attention head, is calculated based on the calculated halting probabilities and the respective encodings. The context vector may be calculated in the manner described in relation to step 260. As in step 260, the halting probabilities be used to calculate the context vector without trimming the halting probabilities, e.g. one or more of the halting probabilities are not modified such that the halting probabilities sum to the first threshold, e.g. one. This may accelerate training of the speech recognition system as revision of the values of halting probabilities, e.g. in a halting probability matrix, may not be performed, whereas such revision is performed if the probabilities were to be trimmed. Hence, computational resource usage in training is reduced.

For each self-attention decoder layer of the decoder neural network, a combination step 445B is performed. In the combination step 445B, a combined context vector is calculated based on the context vectors for each of the self-attention heads. The combined context vector may be calculated in the manner described in relation to step 350A. The combination step 445B, and consequently the steps following, may be performed where the accumulator variables for each of the self-attention heads have reached the threshold, e.g. when accumulator variables for a final one or more attention heads of the plurality of attention heads exceeding or reaching the first threshold, with the remainder of the one or more attention heads having previously exceeded or reached the threshold.

Then, a decoding step 450B is performed. In the decoding step 4508 the context vector is used to derive a token. The decoding step may be performed in the manner described in relation to step 270.

In an update step 404B, weights of each of the self-attention decoder layers are updated based on a difference between the derived sequence of tokens and the training sequence of tokens in accordance with a loss function. The weights may be updated in the manner described in relation to update step 404A. The loss function may be any loss function described in relation to update step 404A.

For the purposes of ease of explanation, update step 404B has been described as occurring for each training pair. However, it should be noted that in some variations, the update step 404B may occur for only some of the training pairs, e.g. for every Nth training pair. In these cases, the update of the weights is based on the difference between each of N derived sequences of tokens and corresponding training sequence of tokens since the last update, and may be calculated in accordance with a loss function. For example, the update may be based on average of the losses calculated for each of the derived sequences of tokens and corresponding training sequences of tokens. Such methods for updating the weights may be referred to as batch update or mini-batch methods.

Second Variation of a Speech Recognition System Training Method

FIG. 4C is a flow diagram of a method 400C which is a second variation of a method for training a speech recognition system. The example method 400C may be implemented as one or more computer-executable instructions executed by one or more computing devices, e.g. the hardware 700 described in relation to FIG. 7.

The following steps are performed for each training pair of a training set. Each training pair includes a plurality of frames of speech audio and a sequence of training tokens. The training sequence of tokens may also be described as a gold standard sequence or reference sequence. The training sequence of tokens may have be or be derived from an indication by a human of the contents of an utterance to which the plurality of frames of speech audio correspond. For example, a sequence of tokens representing the word, phrase(s) or sentence(s)

In step 402C, a sequence of tokens is derived based on the plurality of frames of speech audio. A token of the sequence of tokens may be derived using the steps 410C-450C. Where the sequence of tokens includes a plurality of tokens, further tokens of the sequence of tokens may be arrived by applying the steps 410C-450C to remaining frames of the plurality of frames of speech audio.

For each self-attention decoder layer of a decoder neural network, an initialization step 410C is performed. In the initialization step 410C, a shared accumulator variable is initialized.

For each self-attention decoder layer, a halting probability calculation step 420C and an addition step 430C are performed for each self-attention head for each of a plurality of frames of speech audio of the training pair until the shared accumulator variable for the respective self-attention decoder layer exceeds or reaches a threshold, e.g. a threshold of H where H is the number of self-attention heads. Then, for each self-attention head, a context vector calculation step 440C is performed.

Using a shared accumulator variable, and, hence a shared condition and threshold, is that the last frame of speech audio for which a halting probability is calculated and a context vector calculated, e.g. the halting position, is the same for each of the attention heads, so no synchronisation is required. The sum of halting probabilities calculated by each head is not capped at a respective threshold, e.g. one. Instead, the active heads could account for more attention confidence that is compromised by the inactive ones, which effectively helps reduce the loss of attention beyond the joint halting position.

In the probability calculation step 420C, a halting probability is calculated, by a self-attention decoder layer of a decoder neural network. The halting probability may be calculated in the manner described in step 230.

In the addition step 430C, the halting probability is added to the shared accumulator variable.

In the context vector calculation step 440C, a context vector for the respective self-attention head is calculated based on the calculated halting probabilities and the respective encodings. The context vector may be calculated in the manner described in relation to step 260. As in step 260, the halting probabilities be used to calculate the context vector without trimming the halting probabilities, e.g. one or more of the halting probabilities are not modified such that the halting probabilities sum to the first threshold, e.g. one. This may accelerate training of the speech recognition system as revision of the values of halting probabilities, e.g. in a halting probability matrix, may not be performed, whereas such revision is performed if the probabilities were to be trimmed. Hence, computational resource usage in training is reduced.

For each self-attention decoder layer of the decoder neural network, a combination step 445C is performed. In the combination step 445C, a combined context vector is calculated based on the context vectors for each of the self-attention heads.

Then, a decoding step 450C is performed. In the decoding step 450C the context vector is used to derive a token. The decoding step may be performed in the manner described in relation to step 270.

In an update step 404C, weights of each of the self-attention decoder layers are updated based on a difference between the derived sequence of tokens and the training sequence of tokens in accordance with a loss function. The weights may be updated in the manner described in relation to update step 404A. The loss function may be any loss function described in relation to update step 404A.

For the purposes of ease of explanation, update step 460C has been described as occurring for each training pair. However, it should be noted that in some variations, the update step 460C may occur for only some of the training pairs, e.g. for every Nth training pair. In these cases, the update of the weights is based on the difference between each of N derived tokens and corresponding training tokens since the last updates, and may be calculated in accordance with a loss function. For example, the update may be based on average of the losses calculated for each of the derived tokens and corresponding training tokens. Such methods for updating the weights may be referred to as batch update or mini-batch methods.

For the purposes of ease of explanation, update step 404C has been described as occurring for each training pair. However, it should be noted that in some variations, the update step 404C may occur for only some of the training pairs, e.g. for every Nth training pair. In these cases, the update of the weights is based on the difference between each of N derived sequences of tokens and corresponding training sequence of tokens since the last update, and may be calculated in accordance with a loss function. For example, the update may be based on average of the losses calculated for each of the derived sequences of tokens and corresponding training sequences of tokens. Such methods for updating the weights may be referred to as batch update or mini-batch methods.

Speech Recognition Network

Figure 5:
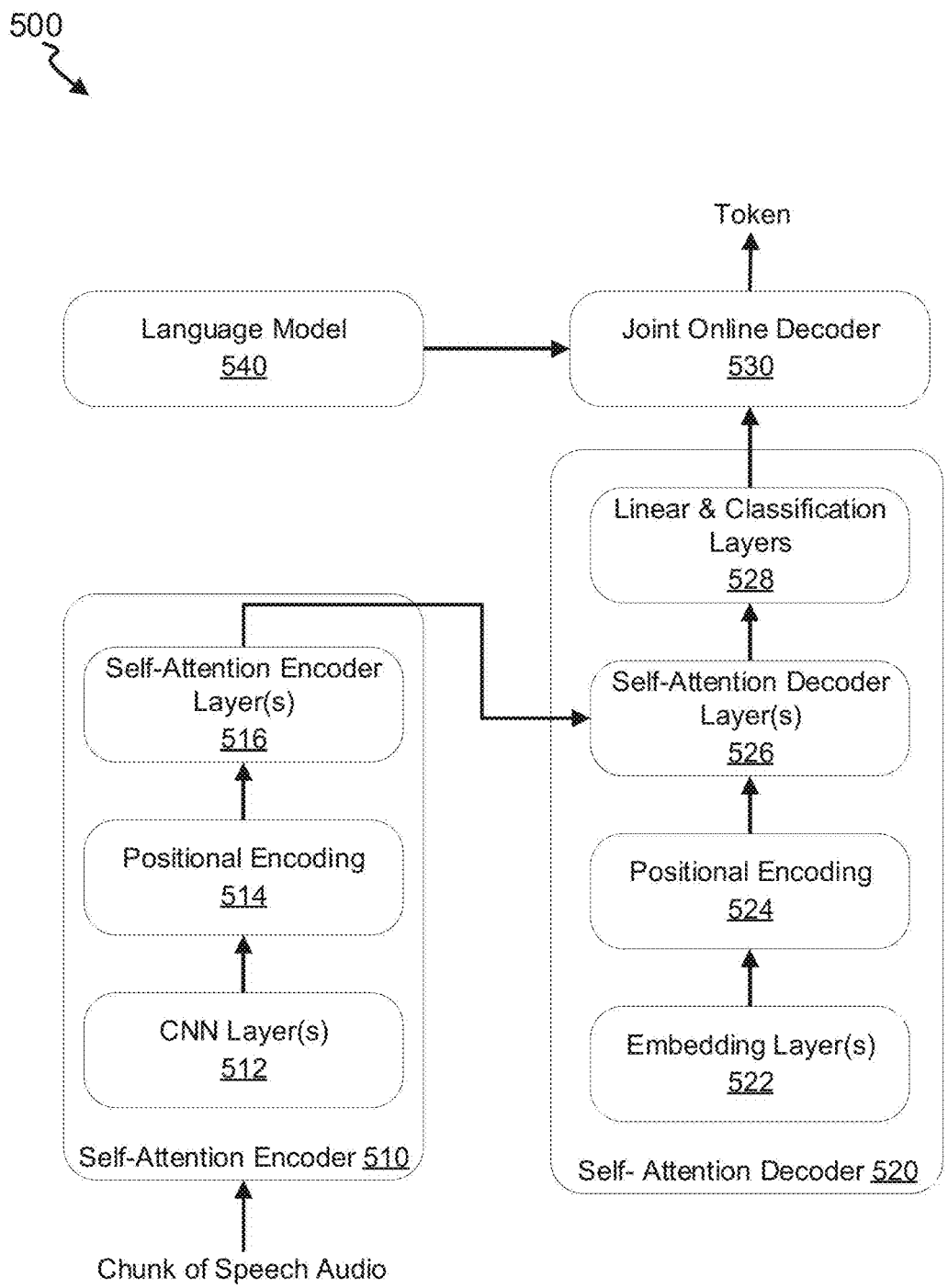
FIG. 5 is a schematic block diagram of a system for performing speech recognition in accordance with example embodiments.

FIG. 5 is a schematic block diagram of a system for performing speech recognition in accordance with example embodiments. The system 500 may be implemented using one or more computer-executable instructions on one or more computing devices, e.g. the hardware 700 described in relation to FIG. 7.

The system 500 comprises a self-attention encoder 510. The self-attention encoder 510 may be a chunkwise self-attention encoder. The self-attention encoder receives a chunk of speech. The chunk of speech audio includes a plurality of frames of audio. The self-attention encoder 510 encodes the plurality of frames in the chunk of speech audio to produce corresponding encodings for the plurality of frames of speech audio. The encoding of the frames of speech audio in the chunk may be substantially simultaneous. The number of frames of speech audio in the chunk may be referred to as $N_c$. The chunk of speech audio may be complemented by $N_l$ left frames of speech audio, e.g. frames received prior to the frames in the chunk, and $N_r$ right frames of speech audio, e.g. frames received after the frames in the chunk. The $N_l$ left frames and the $N_r$ frames are used to provide context for the encoding of the chunk of speech audio, but it is the encodings of the frames of speech audio in the chunk that are used in decoding. The latency in encoding may be limited to the number of right frames of speech audio, $N_r$, e.g. the length of audio that $N_r$ frames represents. $N_c$, $N_l$, and $N_r$ may be equal to one another. In an implementation, $N_c$, $N_l$, and $N_r$ may be 64.

The self-attention encoder 510 includes one or more convolutional neural network layers 512. The use of one or more convolutional neural network layers 512 may improve extraction of acoustic features from the frames of speech audio in the chunk and perform subsampling on the frames in the chunk of speech audio. In an implementation, the one or more convolutional neural network layers 512 may be two identical convolutional neural network layers having 256 kernels of size 3×3 with a stride of 2×2 that reduces the frame rate by 2-fold. The one or more convolutional neural network layers produce an output for subsequent layers.

The self-attention encoder 510 further includes a positional encoding layer 514. The positional encoding layer 514 augments the output of the one or more convolutional neural network (CNN) layers with sequence order information, e.g. information indicating the position of output of the CNN corresponding to a given frame compared to other frames encoder.

The self-attention encoder 510 further includes one or more self-attention encoder layers 516. Each self-attention encoder layer may have two sub-layers: a self-attention sub-layer and a position-wise feed forward sub-layer. The self-attention layer may be a multi-head attention layer. Each self-attention encoder layer may use residual connections and layer normalisation after each sub-layer. The input to a first of the one or more self-attention encoder layers 516 is the output of the positional encoding layer 514. The input to subsequent layers of the one or more self-attention encoder layers is the output of the preceding self-attention encoder layer. In an implementation, the one or more self-attention encoder layers 516 may be 12 self-attention encoder layers.

The system 500 comprises a self-attention decoder 520. The self-attention decoder 520 receives as an input a previous output, e.g. a previously output token.

The self-attention decoder 520 comprises one or more embedding layers 522. The one or more embedding layers 522 process the output token to an embedding of the output token, e.g. a vector embedding. In an implementation, the embedding has a dimensionality of 256, e.g. is a vector having 256 elements.

The self-attention decoder 520 comprises a positional encoding layer 524. The positional encoding layer 514 augments the embedding with sequence order information, e.g. information indicating the position of the token in an output sequence of tokens, such as a phrase or sentence.

The self-attention decoder 520 comprises one or more self-attention decoder layers 526. Each self-attention decoder layer may have three sub-layers: a self-attention sub-layer; a decoder adaptive computation steps (DACS) sub-layer, and a position-wise feed forward sub-layer. Each self-attention decoder layer may use residual connections and layer normalisation after each sub-layer. A first of the one or more self-attention decoder layers receives the augmented embedding as an input, i.e. the output of the positional encoding layer. Subsequent self-attention decoder layers receive the output of a preceding self-attention decoder layer. By way of the attention mechanism, the self-attention decoder layers also access encodings of frames produced by the self-attention encoder 510. In an implementation, the one or more self-attention decoder layers 526 may be 6 self-attention decoder layers, the dimensions of the self-attention and DACS sub-layers for each self-attention decoder layer may be 256, the position-wise feedforward sub-layer of each self-attention decoder layer may have 2048 units, and each self-attention decoder layer may include four attention heads.

The self-attention decoder 520 comprises linear and classification layers 528. The linear and classification layers process the output of the self-attention decoder layers to determine a plurality of probabilities or scores, e.g. a vector of probabilities or scores, with each probability or score indicating the likelihood that a given token is correct. The classification layer may be a cross entropy layer, a softmax layer, or a variation or equivalent thereof.

The system 500 comprises a joint online decoder 530. The joint online decoder receives the plurality of probabilities or scores from the linear and classification layers 528 of the self-attention decoder 520. The joint decoder 530 also utilizes a language model 540 which outputs probabilities or scores for each token based on tokens that have been previously output. Such a joint decoder may calculate joint probabilities or scores based on both the language model probabilities or scores and the probabilities or scores received from the linear and classification layers of the self-attention decoder. The joint probabilities or scores may each be a weighted sum of a language model probability or score and a received probability or score. The joint decoder may also utilize a Connectionist Temporal Classification (CTC) score to perform decoding. The joint probabilities or scores may be further based on the CTC score, and each joint probability or score may be a weighted sum of a language model probability or score, a received probability or score, and the CTC score. A joint score may be defined as $\lambda_{CTC}s_{CTC}+\lambda_r s_r+\lambda_{lm}s_{lm}$ where $s_{CTC}$ is the CTC score, $s_r$ is the received probability or score, $s_{lm}$ is the language model probability or score, and $\lambda_{CTC}$, $\lambda_r$, and $\lambda_{lm}$ are weighting parameters. Each of the weighting parameters may be between zero and one. The weighting parameters may sum to one. These joint probabilities or scores may be used to derive a token by any of the methods described in relation to step 270, e.g. by selecting the token having the greatest probability or score or probabilistically. Beam search may also be used in deriving the token.

The system 500 comprises the language model 540. The language model may be a deep language model implemented using a neural network. For example, the language model may be implemented using a Long Short Term Memory Network.

Speech Audio Pre-processing Method

Figure 6:
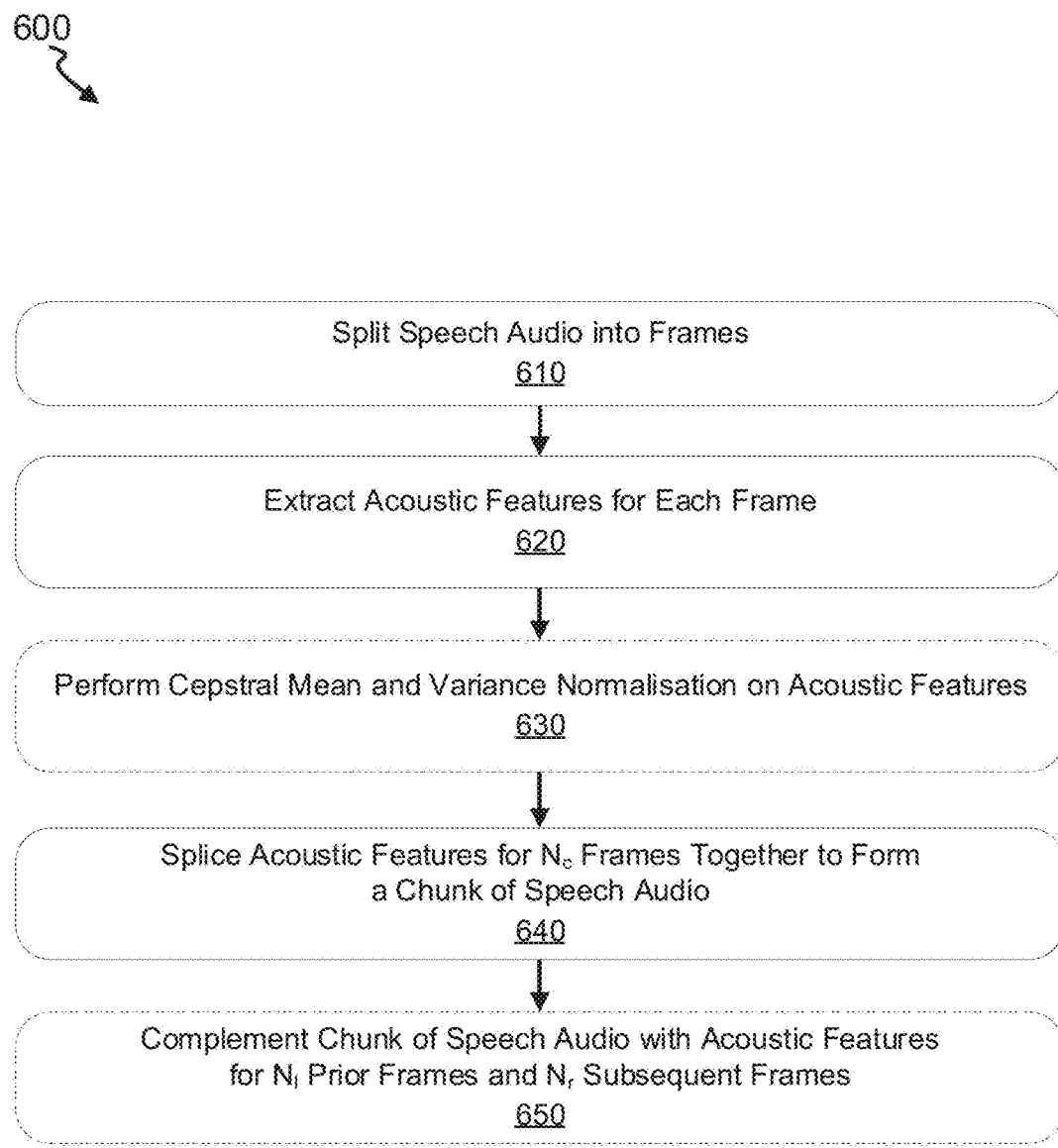
FIG. 6 is a speech audio pre-processing method in accordance with example embodiments.

FIG. 6 is a flow diagram of a method 600 for pre-processing speech audio, e.g. processing speech audio prior to utilizing the processed speech audio for speech recognition and/or training a speech recognition system 600. Optional steps are indicated by dashed lines. The example method 600 may be implemented as one or more computer-executable instructions executed by one or more computing devices, e.g. the hardware 700 described in relation to FIG. 7.

In step 610, the speech audio is split into frames. Each frame may be a window of speech audio. In an implementation, each frame may be a 25 ms window of speech audio with a 10 ms shirt.

In step 620, acoustic features are extracted for each frame of speech audio. The acoustic features may be extracted using a filter bank. In an implementation, the acoustic features may be 80-dimensional filter-banks together with 3-dimensional pitch-related information.

In step 630, cepstral mean and variance normalisation is performed on the acoustic features. As indicated by the dashed lines, Cepstral mean and variance normalization is optional. Cepstral mean and variance normalization may be applied to the acoustic features in training.

In step 640, the acoustic features for $N_c$ frames, where $N_c$ is a chunk size, are spliced together to form a chunk of speech audio. The chunk size may be defined as the number of frames of speech audio per chunk.

In step 650, the chunk of speech audio is complemented with acoustic features for $N_l$ prior frames and acoustic features for $N_r$ subsequent frames.

Computing Hardware

Figure 7:
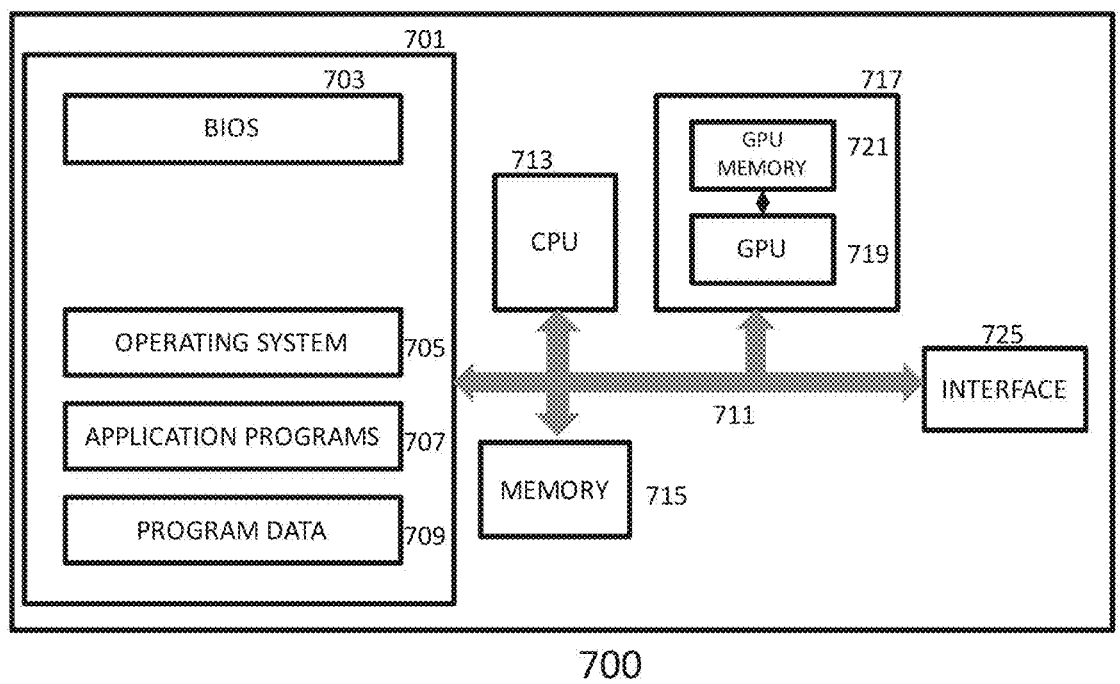
FIG. 7 is a schematic diagram of computing hardware using which example embodiments may be implemented.

FIG. 7 is a schematic of the hardware that can be used to implement methods in accordance with embodiments. It should be noted that this is just one example and other arrangements can be used.

The hardware comprises a computing section 700. In this particular example, the components of this section will be described together. However, it will be appreciated they are not necessarily co-located.

Components of the computing system 700 may include, but not limited to, a processing unit 713 (such as central processing unit, CPU), a system memory 701, a system bus 711 that couples various system components including the system memory 701 to the processing unit 713. The system bus 711 may be any of several types of bus structure including a memory bus or memory controller, a peripheral bus and a local bus using any of a variety of bus architecture etc. The computing section 700 also includes external memory 715 connected to the bus 711.

The system memory 701 includes computer storage media in the form of volatile/or non-volatile memory such as read-only memory. A basic input output system (BIOS) 703 containing the routines that help transfer information between the elements within the computer, such as during start-up is typically stored in system memory 701. In addition, the system memory contains the operating system 705, application programs 707 and program data 709 that are in use by the CPU 713.

Also, interface 725 is connected to the bus 711. The interface may be a network interface for the computer system to receive information from further devices. The interface may also be a user interface that allows a user to respond to certain commands et cetera.

In this example, a video interface 717 is provided. The video interface 717 comprises a graphics processing unit 719 which is connected to a graphics processing memory 721.

Graphics processing unit (GPU) 719 is particularly well suited to the training of the speech recognition system due to its adaptation to data parallel operations, such as neural network training. Therefore, in an embodiment, the processing for training the speech recognition system may be divided between CPU 713 and GPU 719.

It should be noted that in some embodiments different hardware may be used for the training the speech recognition system and for performing speech recognition. For example, the training of the speech recognition system may occur on one or more local desktop or workstation computers or on devices of a cloud computing system, which may include one or more discrete desktop or workstation GPUs, one or more discrete desktop or workstation CPUs, e.g. processors having a PC-oriented architecture, and a substantial amount of volatile system memory, e.g. 16 GB or more. While, for example, the performance of speech recognition may use mobile or embedded hardware, which may include a mobile GPU as part of a system on a chip (SoC) or no GPU; one or more mobile or embedded CPUs, e.g. processors having a mobile-oriented architecture, or a microcontroller-oriented architecture, and a lesser amount of volatile memory, e.g. less than 1 GB. For example, the hardware performing speech recognition may be a voice assistant system 120, such as a smart speaker, or a mobile phone including a virtual assistant. The hardware used for training the speech recognition system may have significantly more computational power, e.g. be able to perform more operations per second and have more memory, than the hardware used for performing tasks using the agent. Using hardware having lesser resources is possible because performing speech recognition, e.g. by performing inference using one or more neural networks, is substantially less computationally resource intensive than training the speech recognition system, e.g. by training one or more neural networks. Furthermore, techniques can be employed to reduce the computational resources used for performing speech recognition, e.g. for performing inference using one or more neural networks. Examples of such techniques include model distillation and, for neural networks, neural network compression techniques, such as pruning and quantization.

First Experimental Results for DACS-based Transformer ASR

Experiments investigating performance of the speech recognition system 500 trained using the method 400B and performing inference using the method 300A is described below are described below. This may be referred to as DACS-based Transformer automatic speech recognition (ASR).

The DACS-based Transformer ASR is evaluated on two datasets: English Wall Street Journal (WSJ) corpus and Mandarin Chinese AlShell-1 corpus, following the data-preparation recipes in ESPNET toolkit. Speech perturbation is applied on the training set of AlShell-1 with factors of 0.9 and 1.1. The acoustic features are 80-dimensional filter-banks together with 3-dimensional pitch-related information, extracted from a 25 ms window with a 10 ms shift. Cepstral Mean and Variance Normalisation (CMVN) is performed on the training set, and the estimated parameters are also applied to the development and test sets. In terms of output labels, WSJ and AlShell-1 have 52 and 4231 classes, respectively.

A variant of the system 500 is adopted for both the tasks. The variant is composed of a 12-layer chunk-SAE and a 6-layer SAD. Two identical CNN layers are used before the chunk-SAE, with each having 256 kernels of size 3×3 with a stride of 2×2 that reduces the frame rate by 2-fold. The chunk sizes of the chunk-SAE are $N_c=N_l=N_r=64$. The dimensions of all self-attention and DACS sub-layers plus the SAD's embedding layer are set to 256, and 4 heads are used in the multi-head mechanism. The position-wise feed-forward layers have 2048 units.

For training, a CTC loss for performing multi-objective learning with the weight, which is $\lambda_{CTC}=0.3$, is used Label smoothing is applied to the cross-entropy loss of Transformer with the penalty factor of 0.1. The models are trained up to 100 epochs for WSJ and 50 epochs for AlShell-1 using Adam optimizer where the early-stopping criterion is imposed with the patience of 3 epochs. The learning rate follows Noam weight decay strategy which is initialized to 10.0 for WSJ and 1.0 for AlShell-1, while the warmup step is 25000 for both. To prevent over-fitting, dropout is applied to the self-attention and DACS sub-layers with the rate of 0.1. The mini-batch size is set to 32. The maximum look-ahead step M, e.g. the second threshold, is not applied during training.

During inference, CTC scores are utilized to carry out joint online decoding with $\lambda_{CTC}=0.3$ for WSJ and $\lambda_{CTC}=0.5$ for AlShell-1. An external LM trained with the texts of training set is involved to rescore the beam search (beam width=10) hypotheses produced by the Transformer, where the LM for WSJ is an 1000 unit single layer Long Short Term Memory (LSTM) network, and for AlShell-1 is a 650-unit 2-layer LSTM. Models of last 10 epochs are averaged and used for inference.

For the WSJ corpus, the DACS-based transformer achieves a word error rate of 8.9 on the dev93 development set, and a word error rate of 5.5 on the eval92 evaluation set. In this evaluation, a maximum look ahead step, M, of 10 is used.

For the AlShell-1 corpus, the DACS-based transformer achieves a character error rate of 6.5 for the dev development set and a character error rate of 7.4 for the test test set. In this evaluation, a maximum look ahead step, M, of 14 is used.

The speed of training and inference is also evaluated for the Al-Shell 1 DACS-based transformer. Training using a Geforce RTX 2080 Ti GPU takes 86.2 minutes.

The speed of inference is measured in terms of the computation cost in the self-attention sub-layers by defining a ratio:

$$r = \frac{\sum_{i=1}^{N_d}\sum_{h=1}^{H}\sum_{l=1}^{L} s_i^{h,l}}{(N_d \times H \times L) \times T} \quad \text{(Equation 10)}$$

where $s_i^{h,l}$ is the number of computation steps performed at output step i by head$_h$ in the $l^{th}$ SAD layer, and T denotes the number of encoding timesteps, with each aggregated for all L output steps, H heads and $N_d$ layers. The smaller the ratio is, the lower the cost committed during inference. The ratio is 0.62 for the dev development set and 0.61 for the test test set.

Figure 8A:
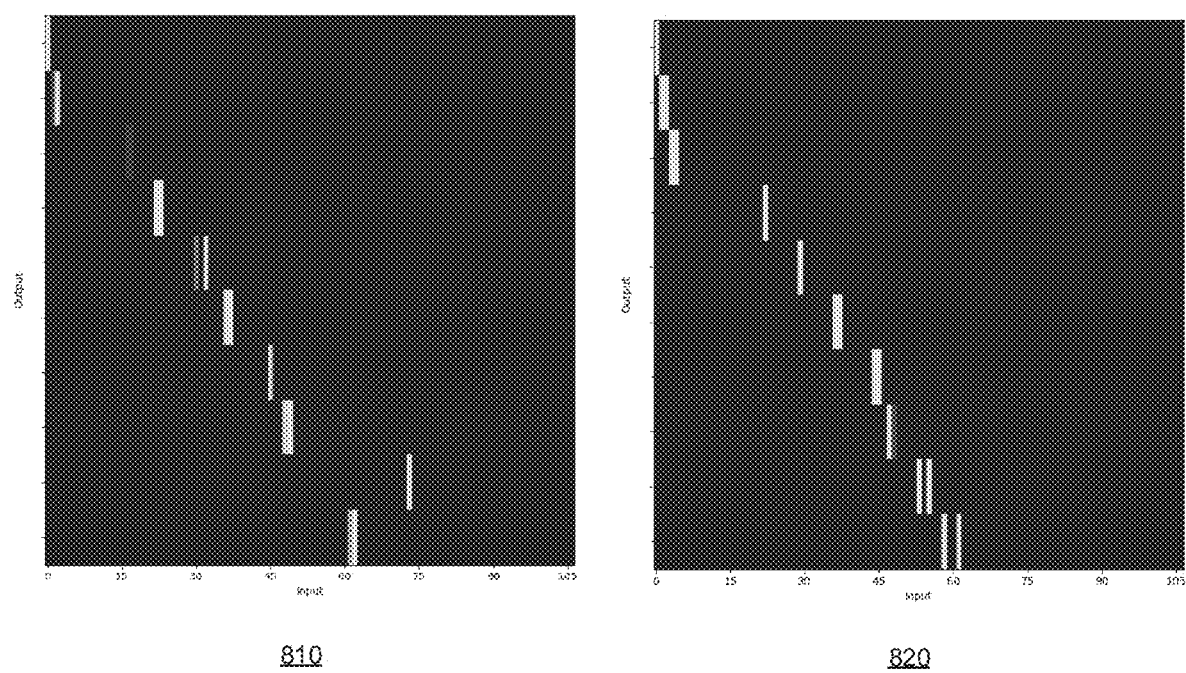

FIG. 8A-8B illustrate halting probabilities for a top self-attention decoder layer of the DACS-based transformer for the AlShell-1 corpus to illustrate speech-to-text alignment. The horizontal axis represents the encoding timestep and the vertical represents the output step. Each of 810, 820, 830, 840 illustrate halting probabilities for a respective one of the attention heads. The halting probabilities are for an example utterance taken from the AlShell-1 Corpus. As is illustrated, the self-attention heads obtain sharp attention weights, and the halting positions are early. This may be because the truncation towards the halting confidence has pushed the encoding information backward in time, so as to minimise the loss of attention, which is a desirable property in online automatic speech recognition.

Experimental Results for HS-DACS-based Transformer ASR and Second Experimental Results for DACS-based Transformer ASR Experiments investigating performance of the speech recognition system 500 trained using the method 400C and performing inference using the method 300B is described below are described below. This may be referred to as Head-Synchronous-DACS-based Transformer automatic speech recognition (ASR), or HS-DACS ASR. These are compared with DACS-based Transformer automatic speech recognition (ASR), e.g. the speech recognition system 500 trained using the method 400B and performing inference using the method 300A.

HS-DACS-based transformer Wall Street Journal (WSJ), Librispeech for English tasks, and AlShell-1 for a Chinese task, based on the recipes in ESPNET toolkit. The acoustic features are composed of 80-dimensional filter-bank coefficients and 3-dimensional pitch information. The numbers of output classes for WSJ and AlShell-1 are 52 and 4231, respectively. And for Librispeech, BPE sub-word tokenisation is applied to construct a vocabulary of 5000 word-pieces.

A variant of the system 500 is adopted for all the three tasks. The encoder is a 6-layer chunk-SAE. The sizes of central, left and right chunks are identical and have a dimension of 64. Two CNN layers are used, with each having 256 kernels of size 3×3 and a stride of 2×2 that subsamples the input frames by 2-fold. The decoder is composed of 12 HS-DACS based self-attention decoder layers, e.g. self-attention decoder layers using the method described in 300B during inference and the method described in 400C during training, where the attention dimension, number of heads and size of feedforward network units are {256, 4, 2048} for WSJ and AlShell-1, and {512,8,2048} for Librispeech respectively.

CTC/attention joint training with the CTC weight of 0.3 is performed for all tasks. The models are trained up to 50 epochs for AlShell-1 and 100 epochs for WSJ and Librispeech. An early stopping criterion with a patience of 3 is only imposed on WSJ. The learning rate is scheduled using the Noam weight decay strategy, where the initial value is set to 10 for WSJ and Librispeech, and 1 for AlShell1, with the warm-up steps all set to 25000. Label smoothing and attention dropout are also applied a the factor of 0.1 to overcome the over-fitting problem. The maximum look-ahead step M is not employed during training.

During inference, the CTC score is also used as an auxiliary term to combine with Transformer's output distribution, with the weights of {0.3,0.5,0.4} for WSJ, AlShell-1 and Librispeech respectively. External LMs are trained as well to rescore the hypothesis produced from the beam-search decoding, which are an 1000-unit 1-layer, a 650-unit 2-layer and a 2048-unit 4-layer Long Short Term Memory (LSTM) network for the tasks in the above order. M is set to 16 for all the self-attention decoder layers, corresponding to the latency introduced by the chunk self-attention encoder.

Tables 1, 2 and 3 present the results of the proposed method on WSJ, AlShell-1 and Librispeech data respectively, and compares it with a DACS-based Transformer. The HS-DACS consistently outperforms the DACS-based transformer on all the tasks.

TABLE 1

Word error rates (WERs) on WSJ.

| Model | dev93 | eval92 |
| --- | --- | --- |
| DACS-based Transformer | 8.9 | 5.5 |
| HS-DACS-based Transformer | 8.8 | 5.4 |

TABLE 2

Character error rates (CERs) on AlShell-1.

| Model | dev | test |
| --- | --- | --- |
| DACS-based Transformer | 6.5 | 7.1 |
| HS-DACS-based Transformer | 6.2 | 6.8 |

TABLE 3

Word error rates (WERs) on Librispeech.

| Model | dev clean | dev other | test clean | test other |
| --- | --- | --- | --- | --- |
| DACS-based Transformer | 2.5 | 6.6 | 2.7 | 6.8 |
| HS-DACS-based Transformer | 2.4 | 6.5 | 2.7 | 6.6 |

To the knowledge of the applicant, the HS-DACS-based Transformer has achieved the state-of-the-art online ASR performance on all three tasks.

Table 4 compares the inference latency between DACS-based and HS-DACS-based Transformer ASR systems reported on AlShell-1 using the ratio defined in equation 10.

The lower the ratio is, the smaller the latency is present during decoding. In the experiment, it is noticed that the maximum look-ahead step is triggered for a majority of output steps, which means the joint-threshold used in the HS-DACS algorithm couldn't be reached by the accumulation of attention confidence. Therefore, e investigate reducing the joint-threshold is investigated in order to cut down the latency further, while observing the effect on the ASR performance.

As shown in Table 4, the joint-threshold, e.g. the first threshold for the shared accumulator variable, of the HS-DACS algorithm from 4.0 to 1.0 is gradually decayed, and meanwhile proportionally reduce the independent threshold of the vanilla DACS algorithm from 1.0 to 0.25 for a fair comparison. It can be seen that the HS-DACS-based transformer yields constantly smaller latency than the DACS-based transformer for all the threshold settings, and that the ASR result remains stable until the joint-threshold

| DACS-based | | | HS-DACS-based | | |
| --- | --- | --- | --- | --- | --- |
| thr | CER (%) | r | joint-thr | CER (%) | r |
| 1.0 | 7.1 | 0.63 | 4.0 | 6.8 | 0.60 |
| 0.75 | 7.2 | 0.58 | 3.0 | 6.9 | 0.55 |
| 0.5 | 7.3 | 0.58 | 2.0 | 7.0 | 0.49 |
| 0.25 | 7.3 | 0.58 | 1.0 | 7.9 | 0.40 | goes down to 2.0. The CER degradation of the DACS system is rather negligible even when the threshold drops to 0.25. This may be because the attention weights, e.g. halting probabilities, tend to be concentrated within a single head of a HS-DACS layer, thus the performance is much more sensitive to the change of threshold than DACS layers, where attentions, e.g. halting probabilities, are evenly distributed across the heads.

Figure 9A:
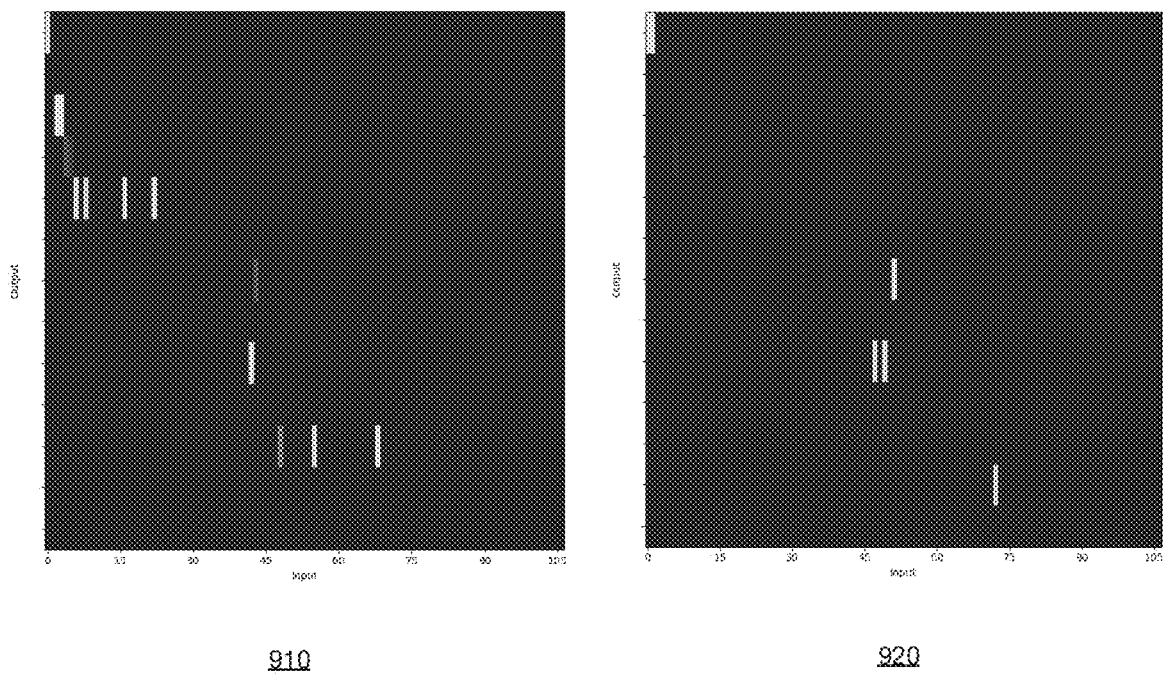
FIGS. 9A and 9B are diagrams of the halting probabilities produced in the decoding process in a HS-DACS-based Transformer ASR system in accordance with example embodiments.
Figure 9B:
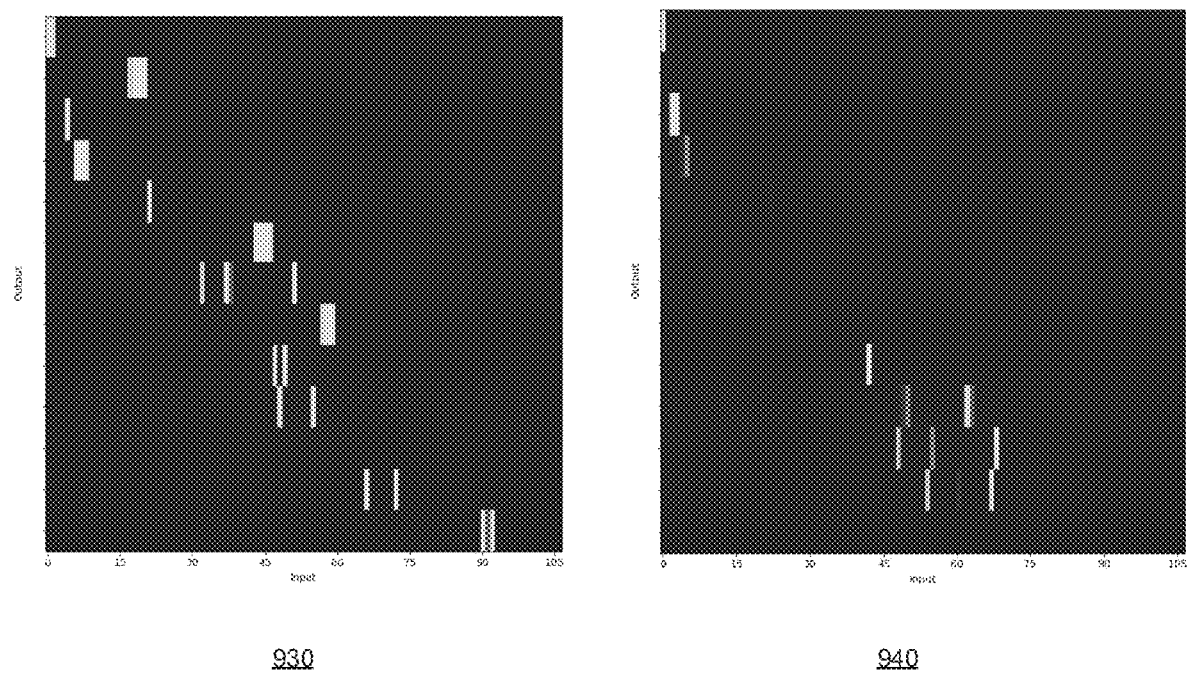

FIGS. 9A-9B illustrate halting probabilities for a top self-attention decoder layer of the HS-DACS-based transformer ASR system for the AlShell-1 corpus to illustrate speech-to-text alignment. The horizontal axis represents the encoding timestep and the vertical represents the output step. Each of 910, 920, 930, 940 illustrate halting probabilities for a respective one of the attention heads. The example utterance for which the halting probabilities are shown is chosen from the dev set of the AlShell-1 corpus.

Figure 10A:
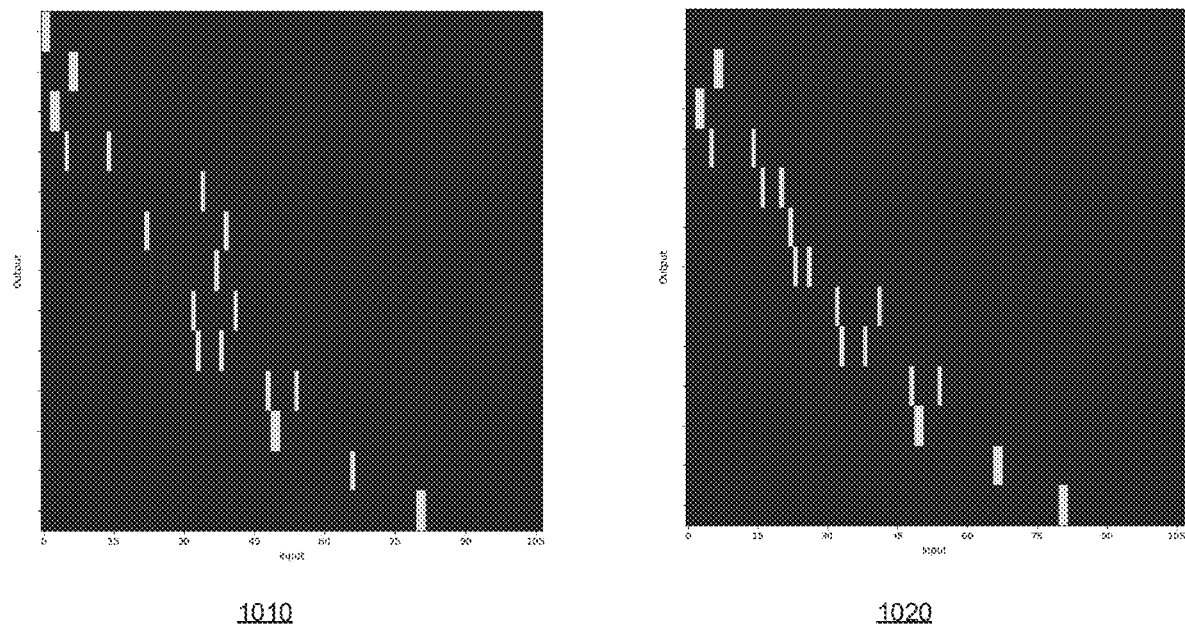
FIGS. 10A and 10B are diagrams of the halting probabilities produced in the decoding process in a second DACS-based Transformer ASR system in accordance with example embodiments.
Figure 10B:
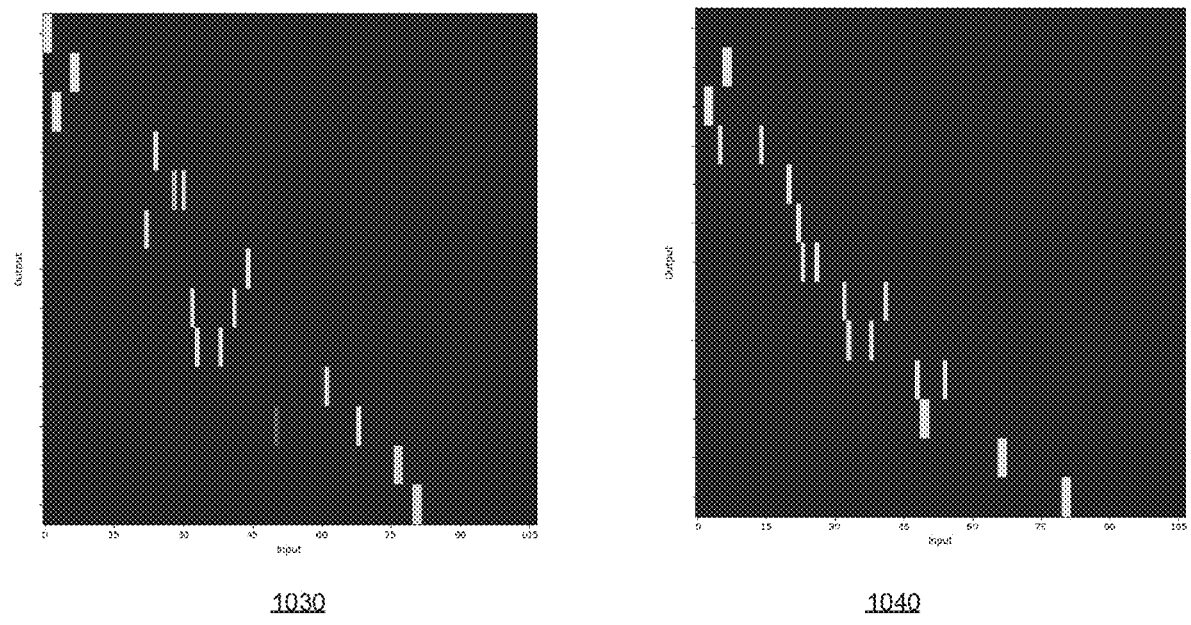

FIGS. 10A-10B for a top self-attention decoder layer of the DACS-based transformer ASR system for the AlShell-1 corpus to illustrate speech-to-text alignment The halting probabilities being calculated for the same example utterance as for the HS-DACS-based transformer ASR system. Each of 1010, 1020, 1030, 140 illustrate halting probabilities for a respective one of the attention heads.

Comparing FIGS. 9A-9B with FIGS. 10A-10B, it can be observed that the self-attention heads in the DACS-based transformer ASR system produce similar and plausible speech-to-text alignments, while the HS-DACS-based transformer system appears to rely on one dominant head, with the others complementing attention weights from different parts of the utterance.

Variations

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A computer-implemented method for speech recognition, comprising:
receiving a frame of speech audio;
encoding by an encoder neural network the frame of speech audio, at least one of the encoder neural network or a decoder neural network being used for the speech recognition;
calculating by the decoder neural network a halting probability based on the encoding of the frame of speech audio;
adding by the decoder neural network the halting probability to a first accumulator variable;
in response to the first accumulator variable exceeding or reaching a first threshold, calculating by the decoder neural network a context vector based on the halting probability and the encoding of the frame of speech audio;
performing by the decoder neural network a decoding step using the context vector to derive a token;
executing a function based on the derived token, wherein the executed function comprises at least one of text output or command performance, wherein the context vector is further based on respective encodings and halting probabilities for a preceding one or more frames of speech audio; and
in response to a count of the preceding one or more frames of speech audio exceeding or reaching a second threshold, triggering the calculating the context vector prior to the first accumulator variable exceeding or reaching the first threshold, the second threshold being different from the first threshold.

2. The method of claim 1, wherein the halting probability and the context vector are calculated using a self-attention decoder layer of a decoder neural network.

3. The method of claim 2, wherein the self-attention decoder layer is a multi-head self-attention decoder layer comprising a plurality of attention heads, and wherein the halting probability and the context vector are calculated using an attention head of the plurality of attention heads.

4. The method of claim 3, wherein, for each of the other attention heads of the plurality of attention heads, a respective halting probability is calculated.

5. The method of claim 4, comprising, for each of the other attention heads of the plurality of attention heads:
adding the respective halting probability to the first accumulator variable; and
in response to the first accumulator variable exceeding or reaching the first threshold, calculating a context vector based on the halting probability and the encoding of the frame of speech audio.

6. The method of claim 4, wherein there is a respective accumulator variable for each of the other attention heads, and comprising, for each of the other attention heads of the plurality of attention heads:
adding the respective halting probability to the respective accumulator variable;
in response to the respective accumulator variable exceeding or reaching the first threshold, calculating a context vector based on the respective halting probability and the encoding of the frame of speech audio.

7. The method of claim 6, wherein performing the decoding step is in response to accumulator variables for a final one or more attention heads of the plurality of attention heads exceeding or reaching the first threshold, wherein a remainder of the one or more attention heads have previously exceeded the first threshold.

8. The method of claim 5, comprising calculating a combined context vector based on the context vectors calculated for each of the plurality of attention heads.

9. The method of claim 8, wherein the decoder neural network comprises one or more further self-attention decoder layers, and comprising calculating a respective combined context vector using each of the one or more further self-attention decoder layers.

10. The method of claim 1, wherein the calculation of the halting probability is further based on a preceding context vector.

11. The method of claim 1, wherein the encoding of the frame of speech audio is by an encoder neural network comprising one or more self-attention encoder layers.

12. The method of claim 1, wherein the context vector is calculated without trimming the halting probabilities.

13. A computer program stored on a non-transitory computer readable medium, which, when the computer program is executed by a computer, causes the computer to carry out the method of claim 1.

14. A computer-implemented method for training a speech recognition system, comprising, for each training pair of a training set, each training pair comprising a plurality of frames of speech audio and a training sequence of tokens:
deriving a sequence of tokens based on the plurality of frames of speech audio, comprising:
initializing an accumulator variable;
for each of the plurality of frames of speech audio until the accumulator variable exceeds or reaches a threshold:
calculating, by a self-attention decoder layer of a decoder neural network, a halting probability based on an encoding of the respective frame of speech audio, wherein the self-attention decoder layer comprises a first plurality of weights of a greater plurality of weights;
adding the halting probability to the accumulator variable;
in response to the accumulator variable exceeding or reaching the threshold, calculating a context vector based on the calculated halting probabilities and the encodings of the respective frame of the plurality of frames of speech audio;
performing a decoding step using the context vector to derive a token of the sequence of tokens; and
updating the first plurality of weights based on a difference between the derived sequence of tokens and the training sequence of tokens in accordance with a loss function, wherein
the context vector is further based on respective encodings and halting probabilities for a preceding one or more frames of speech audio, and
in response to a count of the preceding one or more frames of speech audio exceeding or reaching another threshold, the calculating the context vector is triggered prior to the accumulator variable exceeding or reaching the threshold, the another threshold being different from the threshold.

15. The method of claim 14, wherein the context vector is calculated without trimming the halting probabilities.

16. The method of claim 14, comprising:
encoding, by an encoder neural network, the respective frames of the plurality of frames of speech audio, wherein the encoder neural network comprises a second plurality of weights of the greater plurality of weights;
updating the second plurality of weights based on the difference between the derived sequence of tokens and the training sequence of tokens in accordance with a loss function.

17. The method of claim 15, wherein the self-attention decoder layer is a multi-head self-attention decoder layer comprising a plurality of attention heads, and wherein the halting probability and the context vector are calculated using an attention head of the plurality of attention heads.

18. A system for performing speech recognition, the system comprising:
one or more processors and one or more memories, the one or more processors being configured to:
receive a frame of speech audio,
encode the frame of speech audio,
calculate by a decoding process a halting probability based on the encoding of the frame of speech audio,
add by the decoding process the halting probability to a first accumulator variable,
in response to the first accumulator variable exceeding or reaching a first threshold, calculate by the decoding process a context vector based on the halting probability and the encoding of the frame of speech audio,
perform by the decoding process a decoding step using the context vector to derive a token,
execute a function based on the derived token, wherein the executed function comprises at least one of text output or command performance, wherein the context vector is further based on respective encodings and halting probabilities for a preceding one or more frames of speech audio, and
in response to a count of the preceding one or more frames of speech audio exceeding or reaching a second threshold, trigger calculating the context vector prior to the first accumulator variable exceeding or reaching the first threshold, the second threshold being different from the first threshold.

* * * * *